US009217807B2

(12) United States Patent
Yang et al.

(10) Patent No.: US 9,217,807 B2
(45) Date of Patent: Dec. 22, 2015

(54) SYSTEMS AND METHODS FOR IDENTIFYING SANDING IN PRODUCTION WELLS USING TIME-LAPSE SONIC DATA

(71) Applicant: Schlumberger Technology Corporation, Sugar Land, TX (US)

(72) Inventors: Jiaqi Yang, Belmont, MA (US); Bikash K. Sinha, Cambridge, MA (US); Ting Lei, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 338 days.

(21) Appl. No.: 13/949,202

(22) Filed: Jul. 23, 2013

(65) Prior Publication Data
US 2015/0029823 A1 Jan. 29, 2015

(51) Int. Cl.
*G01V 1/00* (2006.01)
*G01V 1/40* (2006.01)
*G01V 1/50* (2006.01)
*G01V 1/48* (2006.01)

(52) U.S. Cl.
CPC .. *G01V 1/40* (2013.01); *G01V 1/50* (2013.01); *G01V 1/48* (2013.01)

(58) Field of Classification Search
CPC .................................. G01V 1/40; G01V 1/50
See application file for complete search history.

(56) References Cited

U.S. PATENT DOCUMENTS

| 6,098,021 | A | 8/2000 | Tang et al. | |
|---|---|---|---|---|
| 7,529,152 | B2 | 5/2009 | Sinha et al. | |
| 2006/0285437 | A1* | 12/2006 | Sinha et al. | 367/37 |
| 2010/0020642 | A1 | 1/2010 | Sinha | |
| 2011/0251797 | A1* | 10/2011 | Leger et al. | 702/14 |

FOREIGN PATENT DOCUMENTS

| WO | 2004/003590 | 1/2004 |
|---|---|---|
| WO | 2011/051782 | 5/2011 |
| WO | 2012/087796 | 6/2012 |

OTHER PUBLICATIONS

International search report and written opinion for the equivalent PCT patent application No. PCT/US14/047791 issued on Nov. 6, 2014.
V. Pistre et al., "A modular Wireline sonic tool for measurements of 3D (azimuthal, radial and axial) formation acoustic properties," Proceedings of the 46th Annual Logging Symposium, Society of Professional Well Log Analysts (2005), Paper P.

(Continued)

*Primary Examiner* — Luke Ratcliffe
*Assistant Examiner* — Hovhannes Baghdasaryan
(74) *Attorney, Agent, or Firm* — Daryl R. Wright; Jody DeStefanis

(57) ABSTRACT

Systems and methods for identifying sanding in production wells using time-lapse sonic data. Formation anisotropy can be characterized in terms of shear moduli in a vertical wellbore, e.g., vertical shear moduli $C_{44}$ and $C_{55}$ in the wellbore axial planes and horizontal shear modulus $C_{66}$ in the wellbore cross-sectional plane. Changes in formation anisotropy between different times can provide qualitative indicators of the occurrence of sanding in the production well. Before production begins, the horizontal shear modulus $C_{66}$ is typically less than the vertical shear modulus $C_{44}$ or $C_{55}$ or both. At a subsequent time after sanding occurs, the horizontal shear modulus $C_{66}$ is typically greater than the vertical shear modulus $C_{44}$ or $C_{55}$ or both. By comparing the shear moduli of the vertical wellbore at different times, it is possible to identify the occurrence of sanding in the production well using time-lapse sonic data.

20 Claims, 18 Drawing Sheets

(56) References Cited

OTHER PUBLICATIONS

F.L. Paillet and A. Cheng, "Acoustic waves in boreholes," CRC Press, 1991.

B.K. Sinha, et al, "Radial profiling of the three formation shear moduli and its application to well completions," Geophysics, (2006), 71(6) E65-E77.

C. Hsu and B.K. Sinha, "Mandrel effects on the dipole flexural mode in a borehole," Journal of Acoustical Society of America, (1998), 104, 2025-2039.

B.K. Sinha, et al., "Influence of a pipe tool on borehole modes," Geophysics, 2009, 74, E111-E123.

W.H. Press, et al, "Numerical recipes in Fortran 77: the art of scientific computing," Cambridge University Press, 1992.

J. Yang, et al, "Estimation of formation shear and borehole fluid slownesses using sonic dispersion data in well-banded cased boreholes," Geophysics 2011, 6, E187-E197.

P.E. Gill, et al., "Practical optimization," Academic Press, (1981).

S.W. Lang, et al, "Estimating slowness dispersion from arrays of sonic logging waveforms," Geophysics, 1987, 52, pp. 530-544.

\* cited by examiner

SYSTEMS AND METHODS FOR IDENTIFYING SANDING IN PRODUCTION WELLS USING TIME-LAPSE SONIC DATA

BACKGROUND

It is well-known that mechanical disturbances can be used to generate elastic waves in earth formations surrounding a borehole, and the properties of these waves can be measured to obtain important information about the formations through which the waves have propagated. Parameters of compressional, shear and Stoneley waves, such as their velocity (or its reciprocal, slowness, which corresponds to the interval transit time typically measured by sonic logging tools) in the formations and in the borehole, can be indicators of formation characteristics that help in evaluation of the location and/or producibility of hydrocarbon resources. A sonic tool (or acoustic tool, logging device, etc.) can be used to obtain and analyze sonic logging measurements of formations surrounding an earth borehole. A sonic tool can include one or more acoustic sources and one or more acoustic receivers. An example sonic tool is SONIC SCANNER™ of SCHLUMBERGER LIMITED. In conventional use of a sonic tool, one can obtain compressional slowness, DTc, shear slowness, DTs, and Stoneley slowness, DTsh, each as a function of depth, z.

An acoustic source in a fluid-filled borehole generates head waves as well as relatively stronger borehole-guided modes. A standard sonic measurement system includes, for example, placing a piezoelectric source and an array of hydrophone receivers inside a fluid-filled borehole. The piezoelectric source can be configured in the form of either a monopole source or a dipole source. The source bandwidth typically ranges from 0.5 to 20 kHz. A monopole source generates primarily the lowest-order axisymmetric mode, also referred to as the Stoneley mode, together with compressional and shear head waves. In contrast, a dipole source primarily excites the lowest-order flexural borehole mode together with compressional and shear head waves. The head waves are caused by the coupling of the transmitted acoustic energy to plane waves in the formation that propagate along the borehole axis.

An incident compressional wave in the borehole fluid produces critically refracted compressional waves in the formation. Those refracted along the borehole surface are known as compressional head waves. The critical incidence angle $\theta i = \sin^{-1}(Vf/Vc)$ where Vf is the compressional wave speed in the borehole fluid; and Vc is the compressional wave speed in the formation. As the compressional head wave travels along the interface, it radiates energy back into the fluid that can be detected by the hydrophone receivers placed in the fluid-filled borehole. In fast formations, the shear head wave can be similarly excited by a compressional wave at the critical incidence angle $\theta i = \sin^{-1}(Vf/Vs)$, where Vs is the shear wave speed in the formation. It is also worth noting that head waves are excited only when the wavelength of the incident wave is smaller than the borehole diameter so that the boundary can be effectively treated as a planar interface.

In a homogeneous and isotropic model of fast formations, as above noted, compressional and shear head waves can be generated by a monopole source placed in a fluid-filled borehole for determining the formation compressional and shear wave speeds. It is known that refracted shear head waves cannot be detected in slow formations (where the shear wave velocity is less than the borehole-fluid compressional velocity) with hydrophone receivers placed in the borehole fluid. In slow formations, formation shear velocities are obtained from the low-frequency asymptote of the flexural dispersion. There are standard processing techniques for the estimation of formation shear velocities in either fast or slow formations from an array of recorded dipole waveforms.

Recorded waveforms at an array of hydrophone receivers can be processed by a modified matrix pencil algorithm to isolate both non-dispersive and dispersive arrivals in the wavetrain. Slowness dispersions in a fluid-filled borehole (with or without tool) can also be calculated from the solution of a classical boundary-value problem. To calculate dispersions, one or more of the following geometrical and material parameters of the equivalent tool structure, borehole fluid, casing pipe and formation can be used: (1) Surface impedance condition at the boundary between the tool and borehole fluid or equivalent tool model parameters and tool size (when necessary), (2) borehole fluid compressional velocity and mass density, (3) casing pipe inner and outer radii, mass density, compressional and shear velocities, and (4) formation mass density, compressional and assumed shear velocities.

Sanding can occur anytime in unconsolidated sandstone reservoir. Severe sand production can seriously damage a well, reduce the production or disable surface equipment. Therefore, it is desirable to develop reliable technologies to identify zones or depths which are more susceptible to sand production.

SUMMARY

Systems and methods for identifying sanding in production wells using time-lapse sonic data are provided herein. Formation anisotropy can be characterized in terms of a plurality of shear moduli in a vertical borehole (or wellbore), e.g., vertical shear moduli $C_{44}$ and/or $C_{55}$ in the borehole axial planes and the horizontal shear modulus $C_{66}$ in the borehole cross-sectional plane(s). For example, sonic data can be measured in the vertical borehole using a sonic tool, and cross-dipole flexural and Stoneley dispersion data can be obtained from the measured (or recorded, collected, etc.) sonic data. Thereafter, the vertical shear moduli $C_{44}$ and/or $C_{55}$ and the horizontal shear modulus $C_{66}$ can be estimated from the cross-dipole flexural dispersion data and the Stoneley dispersion data, respectively. Changes in formation anisotropy between a first time and a second time, which is subsequent to the first time, provide qualitative indicators of the occurrence of sanding in the production well. Optionally, the first time is a time before production begins (e.g., a reference time) and the second time is a time after production begins. Before production begins, the horizontal shear modulus $C_{66}$ is typically less than either of the vertical shear moduli $C_{44}$, $C_{55}$. At a subsequent time after sanding occurs, the horizontal shear modulus $C_{66}$ is typically greater than either of the vertical shear moduli $C_{44}$, $C_{55}$. By comparing relationships between the plurality of shear moduli at the first and second times, it is possible to identify the occurrence of sanding in the production well using time-lapse sonic data.

The systems and methods can also optionally be used to estimate a radial extent of an alteration zone surrounding at least a portion of the casing around the borehole (e.g., near-wellbore alteration). The occurrence of sanding is associated with near-wellbore alteration, which can be manifested in terms of mechanical damage resulting in larger dipole shear wave slowness. The radial extent of the near-wellbore alteration can be estimated based on a shift in a kick-in frequency of the cross-dipole flexural dispersion data. The kick-in frequency as used herein is a frequency where the cross-dipole flexural dispersion data begins to exhibit a positive slope away from a non-dispersive slowness at low frequencies. To estimate the radial extent of the alteration zone, an estimated altered annulus thickness is determined by iterating the predicted kick-in frequency of a modeled cross-dipole flexural dispersion until it matches the kick-in frequency of the measured cross-dipole flexural dispersion.

An example method for identifying a layer of a formation through which a borehole extends that exhibits a significant increase in a volume of sand that reduces a volume of hydrocarbon production during the course of production at the borehole can include generating a first acoustic wave at an acoustic source located in the borehole, receiving first data corresponding to the first acoustic wave at an array of acoustic receivers located in the borehole, obtaining Stoneley dispersion data and cross-dipole flexural dispersion data from the first data, determining a horizontal shear modulus, $C_{66}$, using the Stoneley dispersion data obtained from the first data and determining at least one vertical shear modulus, $C_{44}$ or $C_{55}$, using the cross-dipole flexural dispersion data obtained from the first data. The method can further include generating a second acoustic wave at the acoustic source, receiving second data corresponding to the second acoustic wave at the array of acoustic receivers, obtaining Stoneley dispersion data and cross-dipole flexural dispersion data from the second data, determining a horizontal shear modulus, $C_{66}$, using the Stoneley dispersion data obtained from the second data and determining at least one vertical shear modulus, $C_{44}$ or $C_{55}$, using the cross-dipole flexural dispersion data obtained from the second data. In addition, the first acoustic wave can be generated at a first time, and the second acoustic wave can be generated at a second time subsequent to the first time. The method can also include analyzing changes in the horizontal and vertical shear moduli determined from the first and second data. The changes can provide an indication of a change in anisotropic characteristics of the layer of the formation, which results from production at the borehole.

Optionally, the first and second times can be before and after production begins at the borehole, respectively.

Optionally, in the example method, analyzing changes in the horizontal and vertical shear moduli includes comparing the horizontal shear modulus, $C_{66}$, to the at least one vertical shear modulus, $C_{44}$ or $C_{55}$.

Alternatively or additionally, the method can optionally include determining that the layer of the formation exhibited a substantial increase in the volume of sand between the first and second times if a relationship between the horizontal shear modulus, $C_{66}$, and the at least one vertical shear modulus, $C_{44}$ or $C_{55}$, determined from the first data satisfies $C_{66} < C_{44}$ or $C_{55}$ and a relationship between the horizontal shear modulus, $C_{66}$, and the at least one vertical shear modulus, $C_{44}$ or $C_{55}$, determined from the second data satisfies $C_{66} > C_{44}$ or $C_{55}$. In addition, the substantial increase in the volume of sand as used herein substantially reduces the volume of hydrocarbon production. For example, a substantial increase in the volume of sand reduces the volume of hydrocarbon production to a volume of hydrocarbon production that is approximately less than 50% of the volume of hydrocarbon production at a reference time (e.g., the first time).

Alternatively or additionally, the method can optionally include determining that the layer of the formation exhibited an insubstantial increase in the volume of sand between the first and second times if relationships between the horizontal shear modulus, $C_{66}$, and the at least one vertical shear modulus, $C_{44}$ or $C_{55}$, determined from the first and second data satisfy $C_{66} < C_{44}$ or $C_{55}$. In addition, the insubstantial increase in the volume of sand as used herein does not substantially reduce the volume of hydrocarbon production. For example, the volume of hydrocarbon production is maintained at a volume of hydrocarbon production that is approximately greater than 50% of the volume of hydrocarbon production at a reference time (e.g., the first time) for an insubstantial increase in the volume of sand.

Optionally, in the example method, determining a horizontal shear modulus, $C_{66}$, using the Stoneley dispersion data includes applying an inversion algorithm to the Stoneley dispersion data. Alternatively or additionally, in the example method, the at least one vertical shear modulus, $C_{44}$ or $C_{55}$, is determined using at least one of a low frequency portion of the cross-dipole flexural dispersion data and an inversion algorithm.

Additionally, the method can optionally further include estimating a Stoneley dispersion or a cross-dipole flexural dispersion based on an equivalent-isotropic and radially homogeneous (EIH) model and comparing at least one of the estimated Stoneley dispersion and the estimated cross-dipole flexural dispersion and at least one of the Stoneley dispersion data and the cross-dipole flexural dispersion data obtained from the first or second data. The method can optionally further include confirming an accuracy of at least one of the horizontal or vertical shear moduli $C_{66}$, $C_{44}$ or $C_{55}$ determined using the Stoneley dispersion data or the cross-dipole flexural dispersion data obtained from the first or second data based on the comparison.

Alternatively or additionally, the method can optionally further include estimating a radial extent of an altered zone surrounding at least a portion of a casing that encloses the borehole by identifying a kick-in frequency of each of the cross-dipole flexural dispersion data obtained from the first and second data and calculating a shift in the kick-in frequency between the cross-dipole flexural dispersion data obtained from the first and second data, respectively. The kick-in frequency as used herein is a frequency where the cross-dipole flexural dispersion data exhibits a positive slope away from a non-dispersive slowness at low frequency. The shift in the kick-in frequency can be related to the radial extent of the altered zone.

Additionally, the method can optionally further include computing a cross-dipole flexural dispersion based on an EIH model, setting an initial altered annulus thickness and iterating the altered annulus thickness until a kick-in frequency of the computed cross-dipole flexural dispersion based on the EIH model is approximately equal to the kick-in frequency of the cross-dipole flexural dispersion data obtained from the second data. The iterated altered annulus thickness can approximate the radial extent of the altered zone.

An example system for identifying a layer of a formation through which a borehole extends that exhibits a significant increase in a volume of sand that reduces a volume of hydrocarbon production during the course of production at the borehole can include an acoustic tool with an acoustic source for generating an acoustic wave and an array of acoustic receivers for receiving data corresponding to the acoustic wave. The acoustic tool can optionally be located in the borehole. The system can also include a control unit having at least one processor and at least one memory. The control unit can cause the acoustic source to generate a first acoustic wave, receive first data corresponding to the first acoustic wave from the array of acoustic receivers, obtain Stoneley dispersion data and cross-dipole flexural dispersion data from the first data, determine a horizontal shear modulus, $C_{66}$, using the Stoneley dispersion data obtained from the first data and determine at least one vertical shear modulus, $C_{44}$ or $C_{55}$, using the cross-dipole flexural dispersion data obtained from the first data. The control unit can further cause the acoustic source to generate a second acoustic wave, receive second data corresponding to the second acoustic wave from the array of acoustic receivers, obtain Stoneley dispersion data and cross-dipole flexural dispersion data from the second data, determine a horizontal shear modulus, $C_{66}$, using the Stoneley dispersion data obtained from the second data and determine at least one vertical shear modulus, $C_{44}$ or $C_{55}$, using the cross-dipole flexural dispersion data obtained from the second data. In addition, the first acoustic wave can be generated at a first time, and the second acoustic wave can be generated at a second time, which is subsequent to the first time. Additionally, the control unit can analyze changes in the horizontal and vertical shear moduli determined from the first and second data. The changes can provide an indication of a change in anisotropic characteristics of the layer of the formation resulting from production at the borehole.

Optionally, the first and second times can be before and after production begins at the borehole, respectively.

Optionally, the control unit can analyze changes in the horizontal and vertical shear moduli by comparing the horizontal shear modulus, $C_{66}$, to the at least one vertical shear modulus, $C_{44}$ or $C_{55}$.

Alternatively or additionally, the control unit can optionally further determine that the layer of the formation exhibited a substantial increase in the volume of sand between the first and second times if a relationship between the horizontal shear modulus, $C_{66}$, and the at least one vertical shear modulus, $C_{44}$ or $C_{55}$, determined from the first data satisfies $C_{66} < C_{44}$ or $C_{55}$ and a relationship between the horizontal shear modulus, $C_{66}$, and the at least one vertical shear modulus, $C_{44}$ or $C_{55}$, determined from the second data satisfies $C_{66} > C_{44}$ or $C_{55}$. The substantial increase in the volume of sand as used herein substantially reduces the volume of hydrocarbon production. For example, a substantial increase in the volume of sand reduces the volume of hydrocarbon production to a volume of hydrocarbon production that is approximately less than 50% of the volume of hydrocarbon production at a reference time (e.g., the first time).

Alternatively or additionally, the control unit can optionally further determine that the layer of the formation exhibited an insubstantial increase in the volume of sand between the first and second times if relationships between the horizontal shear modulus, $C_{66}$, and the at least one vertical shear modulus, $C_{44}$ or $C_{55}$, determined from the first and second data satisfy $C_{66} < C_{44}$ or $C_{55}$. The insubstantial increase in the volume of sand as used herein does not substantially reduce the volume of hydrocarbon production. For example, the volume of hydrocarbon production is maintained at a volume of hydrocarbon production that is approximately greater than 50% of the volume of hydrocarbon production at a reference time (e.g., the first time) for an insubstantial increase in the volume of sand.

Optionally, the control unit can determine a horizontal shear modulus, $C_{66}$, using the Stoneley dispersion data by applying an inversion algorithm to the Stoneley dispersion data. Alternatively or additionally, the at least one vertical shear modulus, $C_{44}$ or $C_{55}$, can be determined using at least one of a low frequency portion of the cross-dipole flexural dispersion data and an inversion algorithm.

Additionally, the control unit can optionally further estimate a Stoneley dispersion or a cross-dipole flexural dispersion based on an EIH model and compare at least one of the estimated Stoneley dispersion and the estimated cross-dipole flexural dispersion and at least one of the Stoneley dispersion data and the cross-dipole flexural dispersion data obtained from the first or second data. The control unit can optionally further confirm an accuracy of at least one of the horizontal or vertical shear moduli $C_{66}$, $C_{44}$ or $C_{55}$ determined using the Stoneley dispersion data or the cross-dipole flexural dispersion data obtained from the first or second data based on the comparison.

Alternatively or additionally, the control unit can optionally further estimate a radial extent of an altered zone surrounding at least a portion of a casing that encloses the borehole by identifying a kick-in frequency of each of the cross-dipole flexural dispersion data obtained from the first and second data and calculating a shift in the kick-in frequency between the cross-dipole flexural dispersion data obtained from the first and second data, respectively. The kick-in frequency as used herein is a frequency where the cross-dipole flexural dispersion data exhibits a positive slope away from a non-dispersive slowness at low frequency. The shift in the kick-in frequency can be related to the radial extent of the altered zone.

Additionally, the control unit can optionally further compute a cross-dipole flexural dispersion based on an EIH model, set an initial altered annulus thickness and iterate the altered annulus thickness until a kick-in frequency of the computed cross-dipole flexural dispersion based on the EIH model is approximately equal to the kick-in frequency of the cross-dipole flexural dispersion data obtained from the second data. The iterated altered annulus thickness can approximate the radial extent of the altered zone.

It should be understood that the above-described subject matter may also be implemented as a computer-controlled apparatus, a computer process, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
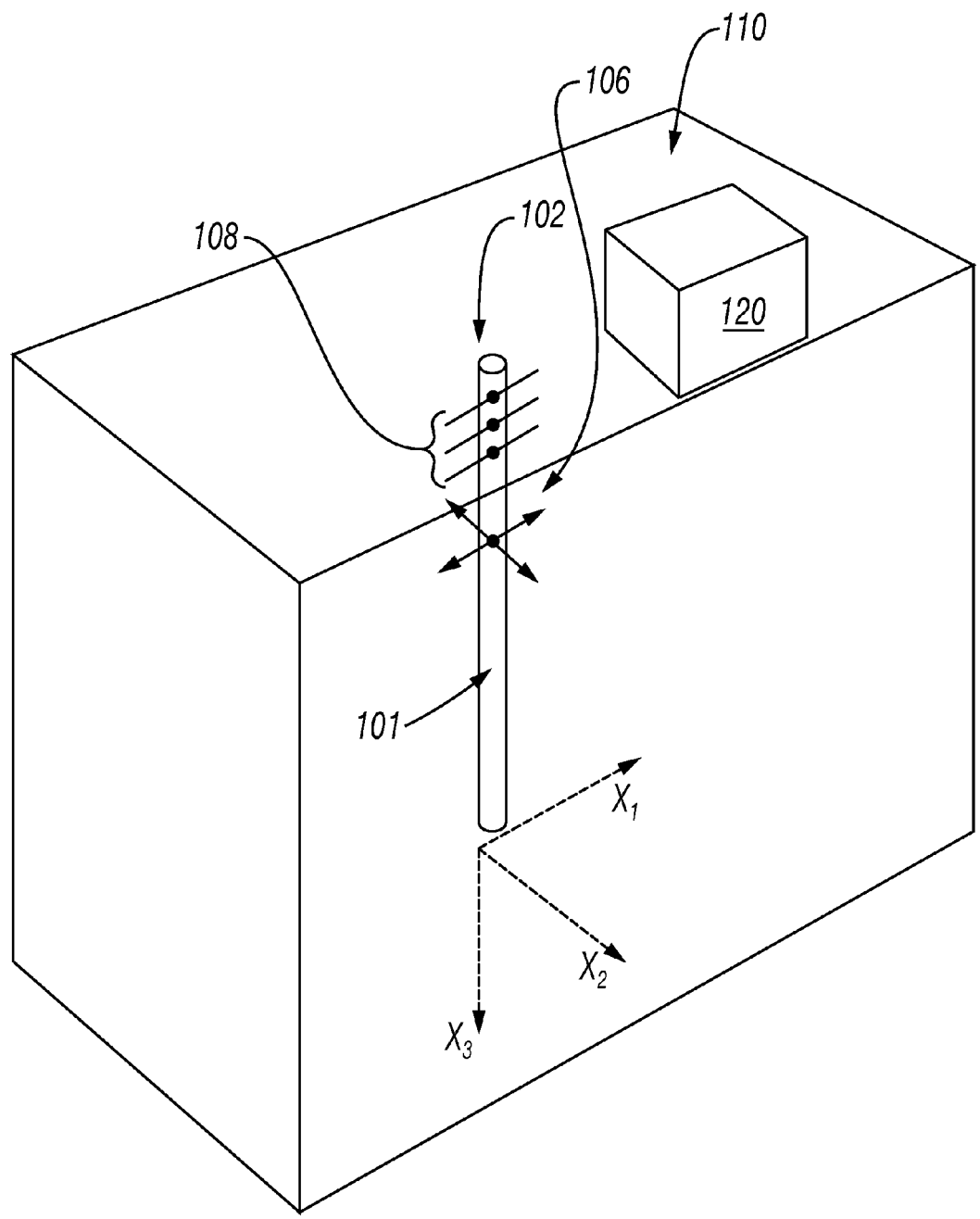
FIG. 1 is a schematic diagram illustrating an example wellbore in a formation according to implementations discussed herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for identifying sanding in production wells using time-lapse sonic data, it will become evident to those skilled in the art that the implementations are not limited thereto.

Systems and methods for identifying sanding in production wells using time-lapse sonic data are provided herein. Sand reservoirs subject to lithostatic stresses are effectively isotropic formations with a slight anisotropy caused by a larger horizontal fluid mobility surrounding a vertical borehole (or wellbore). Formation anisotropy can be characterized in terms of a plurality of shear moduli in the vertical borehole, e.g., vertical shear moduli $C_{44}$ and/or $C_{55}$ in the borehole axial planes such as the orthogonal borehole axial planes and the horizontal shear modulus $C_{66}$ in the borehole cross-sectional plane(s). For example, sonic data can be recorded (or measured, collected, etc.) in the vertical borehole using a sonic tool. Cross-dipole flexural dispersion data and Stoneley dispersion data can be obtained from the sonic data. Thereafter, the vertical shear moduli $C_{44}$ and/or $C_{55}$ can be estimated from the cross-dipole flexural dispersion data. Specifically, the vertical shear moduli $C_{44}$ and/or $C_{55}$ can be estimated from the low-frequency asymptotes of the cross-dipole dispersion data. Additionally, the horizontal shear modulus $C_{66}$ can be estimated from the Stoneley dispersion data, for example, by inverting the Stoneley dispersion data over a select bandwidth. Changes in formation anisotropy between a first time and a second time, which is subsequent to the first time, provide qualitative indicators of the occurrence of sanding in the production well. Optionally, the first time can be a time before production begins (e.g., a reference time) and the second time can be a time after production begins. Before production begins, the horizontal shear modulus $C_{66}$ is typically less than either of the vertical shear moduli $C_{44}$ and $C_{55}$ (e.g., $C_{66}<C_{44}$ or $C_{55}$). After production begins and sanding occurs, the horizontal shear modulus $C_{66}$ is typically greater than either of the vertical shear moduli $C_{44}$ and $C_{55}$ (e.g., $C_{66}>C_{44}$ or $C_{55}$). Thus, by comparing the relationships between the plurality of shear moduli at the first and second times, it is possible to identify the occurrence of sanding in the production well using time-lapse sonic data.

The systems and methods can also optionally be used to estimate a radial extent of an alteration zone surrounding at least a portion of the casing around the borehole (e.g., near-wellbore alteration). The occurrence of sanding is associated with near-wellbore alteration, which can be manifested in terms of mechanical damage resulting in larger dipole shear wave slowness. The radial extent of the near-wellbore alteration can be estimated based on a shift in a kick-in frequency of the cross-dipole dispersion data. The kick-in frequency as used herein is a frequency where the cross-dipole dispersion data begins to exhibit a positive slope away from a non-dispersive slowness at low frequencies. To estimate the radial extent of the alteration zone, an estimated altered annulus thickness is determined by iterating a predicted kick-in frequency of a modeled cross-dipole dispersion until it matches the kick-in frequency of the measured cross-dipole dispersion.

Referring now to FIG. 1, a schematic diagram of a borehole (or wellbore) 102 in a formation 110 is shown. The formation 110 can contain a desirable fluid such as oil or gas. Additionally, the formation can be a sand reservoir, for example. Sand reservoirs subject to lithostatic stresses are effectively isotropic formations with a slight anisotropy caused by a larger horizontal fluid mobility surrounding a vertical production well (e.g., borehole 102). As shown in FIG. 1, the borehole 102 is a vertical wellbore (e.g., parallel to the $X_3$-axis) drilled in the formation 110. The borehole 102 can be used to extract the desirable fluid. Optionally, the borehole 102 can be a fluid-filled wellbore, e.g., filled with a drilling fluid 101. The borehole 102 can have an acoustic tool arranged therein. An acoustic tool (or logging tool, sonic tool, etc.) can include at least one acoustic source 106 and an array of acoustic receivers 108. The acoustic source 106 and the array of acoustic receivers 108 can be part of an acoustic logging tool of any type, including but not limited to, a wireline logging tool, a logging-while-drilling ("LWD") tool or a-measurement-while-drilling ("MWD") tool.

The acoustic source 106 can be configured to excite monopole, dipole or quadrupole acoustic modes. It should be understood that the acoustic source 106 is configured to transmit energy (e.g., acoustic waves) into the formation 110. The energy can be characterized by its frequency and wavelength. Optionally, the acoustic source 106 can transmit broadband energy at frequencies between 0.5 and 20 kHz, for example. The transmitted energy can excite compressional, shear, Stoneley, flexural and/or quadrupole waves in the formation 110. Additionally, the array of acoustic receivers 108 is configured to detect the compressional, shear, Stoneley, flexural and/or quadrupole waves travelling in the drilling fluid 101, for example. It should be understood that the energy transmitted by the acoustic source 106 can be reflected and/or refracted from the fluid-formation interface. By arranging acoustic receivers in an array with different spacing from the acoustic source, it is possible to improve signal quality and extract various borehole signals over a broad frequency band. In addition, it should be understood that the borehole, as well as the acoustic source and the array of acoustic receivers, are provided only as examples and are not intended to be limiting.

The acoustic tool (e.g., the acoustic source 106 and the array of acoustic receivers 108) can be operably connected with a control unit 120. It should be understood that the control unit 120 can optionally be located above, on and/or below the surface of the formation 110. Alternatively or additionally, the control unit 120 can be integrated with the acoustic tool and arranged in the borehole 102. The control unit 120 can optionally be configured to control the acoustic source 106 and/or the array of acoustic receivers 108, as well as receive, process and store sonic data (e.g., the acoustic data detected, collected, recorded, etc. by the array of acoustic receivers 108). In one configuration, the control unit 120 can include at least one processing unit and at least one memory. Depending on the exact configuration and type of control unit 120, the memory may be volatile (such as random access memory (RAM)), non-volatile (such as read-only memory (ROM), flash memory, etc.), or some combinations of the two. The processing unit can be a standard programmable processor that performs arithmetic and logic operations necessary for operation of the control unit 120.

For example, the processing unit can be configured to execute program code encoded in tangible, computer-readable media. Computer-readable media refers to any media that is capable of providing data that causes the control unit 120 (e.g., a machine) to operate in a particular fashion. Various computer-readable media may be utilized to provide instructions to the processing unit for execution. Example tangible, computer-readable media include, but not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In addition, the control unit 120 can have additional features/functionalities. For example, the control unit 120 may include additional storage such as removable storage and non-removable storage including, but not limited to, magnetic or optical disks or tapes. The control unit 120 may also contain network connection(s) that allow it to communicate with other devices. The control unit 120 may also have input device(s) such as a keyboard, mouse, touch screen, etc. Output device(s) such as a display, speakers, printer, etc. may also be included. The additional devices may be connected to a bus in order to facilitate communication of data among the components of the control unit 120.

Figure 2:
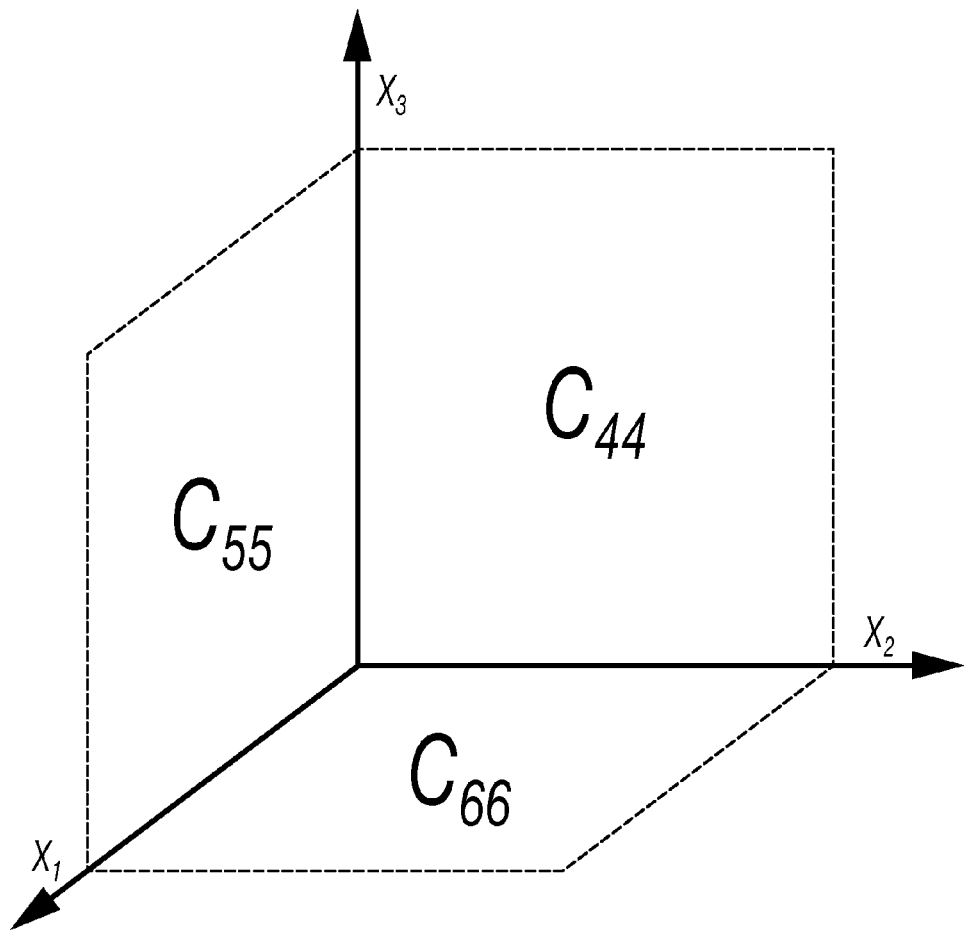
FIG. 2 is a diagram illustrating three shear moduli in two borehole axial planes (e.g., $X_3$-$X_1$ and $X_3$-$X_2$) and a borehole cross-sectional plane (e.g., $X_1$-$X_2$)

Referring now to FIG. 2, a diagram illustrating three shear moduli in two borehole axial planes (e.g., $X_3$-$X_1$ and $X_3$-$X_2$) and a borehole cross-sectional plane (e.g., $X_1$-$X_2$) is shown. As discussed above, a vertical wellbore such as borehole 102 shown in FIG. 1, which is parallel to the $X_3$-axis, can be drilled in a formation. Flexural and Stoneley dispersions can be obtained from the sonic data measured by an acoustic tool (e.g., the acoustic tool including the acoustic source 106 and the array of acoustic receivers 108 shown in FIG. 1). In addition, shear moduli $C_{44}$, $C_{55}$ and $C_{66}$ can be estimated in the vertical wellbore at a given depth. For example, as discussed above, vertical shear moduli $C_{55}$ and $C_{44}$ in the borehole axial planes (e.g., $X_3$-$X_1$ and $X_3$-$X_2$ planes respectively), can be estimated from the low-frequency asymptotes of the cross-dipole dispersions. Additionally, horizontal shear modulus $C_{66}$ in the borehole cross-sectional plane (e.g., $X_1$-$X_2$ plane) can be estimated by inverting the Stoneley dispersion over a selected bandwidth (e.g., 2-3 kHz).

Figure 3A:
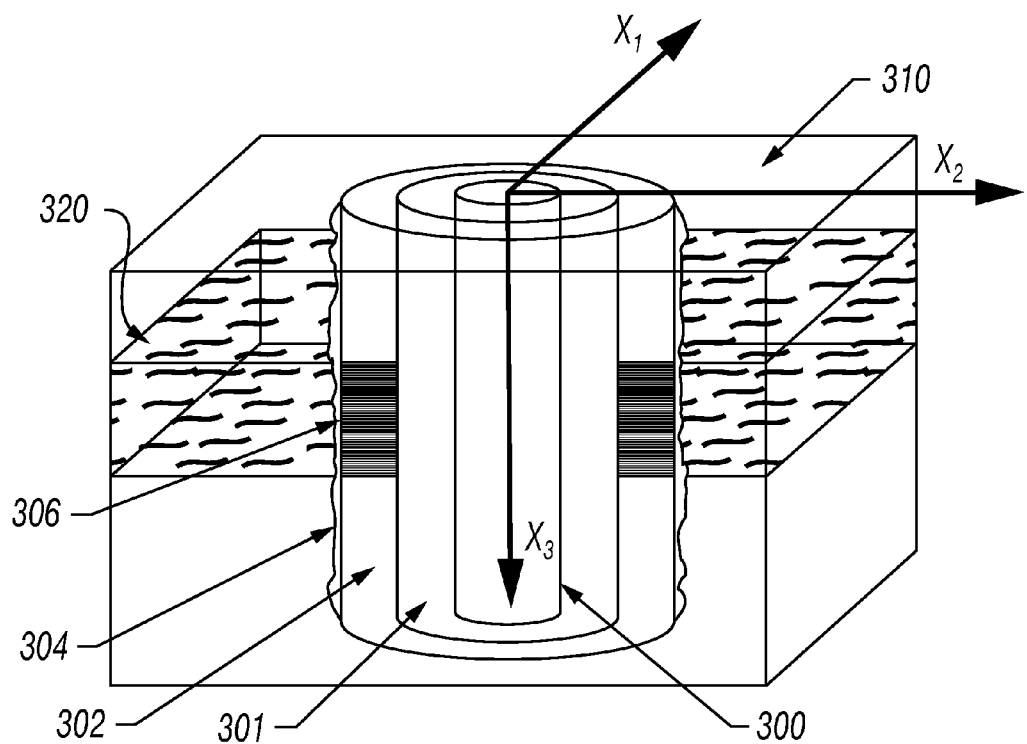
FIG. 3A is a diagram illustrating a permeable sand layer in a formation before sanding occurs.
Figure 3B:
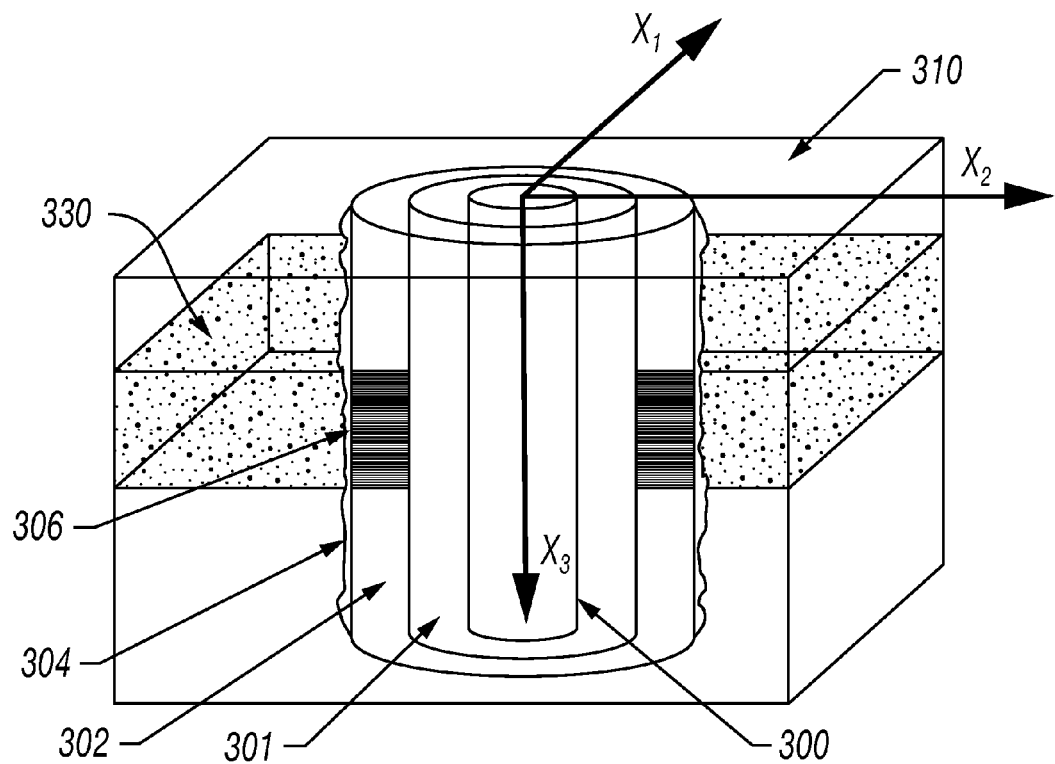
FIG. 3B is a diagram illustrating an impermeable sand layer in a formation after sanding occurs.

Referring now to FIGS. 3A and 3B, diagrams illustrating permeable and impermeable sand layers in a formation before and after sanding occurs, respectively, are shown. In FIGS. 3A and 3B, a vertical borehole is drilled in the formation 310. Similar to FIG. 1, the borehole is parallel to the $X_3$-axis. A casing 302 such as a steel casing, for example, is placed in the open hole. An outer cement annulus 304 is provided around the casing 302. Additionally, the borehole can be a fluid-filled borehole, e.g., filled with a drilling fluid 301. A perforation 306 is provided in the casing 302 to allow a desirable fluid (e.g., hydrocarbons such as oil or gas) in the formation 310 to flow into the borehole. In addition, sonic tool 300 for measuring sonic data can be arranged in the borehole.

Using sonic data collected in the vertical borehole, for example using sonic tool 300 shown in FIGS. 3A and 3B, it is possible to characterize formation anisotropy in terms of the vertical shear moduli $C_{44}$ and $C_{55}$ in the borehole axial planes and the horizontal shear modulus $C_{66}$ in the borehole cross-sectional plane. As discussed above, sand reservoirs subject to lithostatic stresses are effectively isotropic formations with a slight anisotropy caused by a larger horizontal fluid mobility surrounding the vertical borehole. A small amount of shear anisotropy can be introduced in a sand reservoir with a larger fluid mobility in the horizontal direction. FIG. 3A illustrates a reservoir fluid flowing through a permeable sand layer 320 and into the borehole. This type of shear anisotropy is manifested in terms of the following inequality: $C_{66}<C_{55}$ (or $C_{44}$). This type of shear anisotropy is typical in a sand reservoir at the beginning of production and in the absence of significant differences among the three formation principal stresses. In contrast, horizontal layers with negligible fluid mobility, which can be caused by higher clay volume are characterized by the following inequality: $C_{66}>C_{55}$ (or $C_{44}$). This type of shear anisotropy can also be observed after production begins (e.g., after years of production), when the reservoir fluid channels are filled with sands from adjacent layers. Additionally, after years of compaction, the adjacent layers can have a lithology with stiffer horizontal layers relative to the reservoir state at the beginning of production when connected pores are filled with fluids with zero or negligibly small shear rigidity. FIG. 3B shows a formation where there is essentially no reservoir fluid flowing through an impermeable sand layer 330.

As shown in FIGS. 3A and 3B, boreholes (e.g., production boreholes, observation boreholes, etc.) are typically cased boreholes. In other words, a casing 302 is placed in the open hole and a cement annulus 304 is provided around the casing 302. The casing 302 can be made from a metal such as steel. Additionally, the cement annulus 304 can have an irregular geometry, particularly when the casing 302 is not concentrically placed in the open hole and/or if the open hole has an irregular shape due to drilling induced damage (e.g., washouts or breakouts). Further, near-wellbore alterations (e.g., an altered zone) can surround at least a portion of the casing 302. These near-wellbore alterations can extend radially, sometimes a borehole diameter or more or less into the formation. It should be understood that sonic data collected in the cased borehole can be inverted using algorithms that account for the casing. It should also be understood that the techniques discussed herein assume near-wellbore alterations that include the irregular cement annulus together with any near-wellbore alteration that might have been present in the open-hole configuration.

It should be appreciated that the logical operations described herein with respect to the various figures may be implemented (1) as a sequence of computer implemented acts or program modules (e.g., software) running on a computing device, (2) as interconnected machine logic circuits or circuit modules (e.g., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4A:
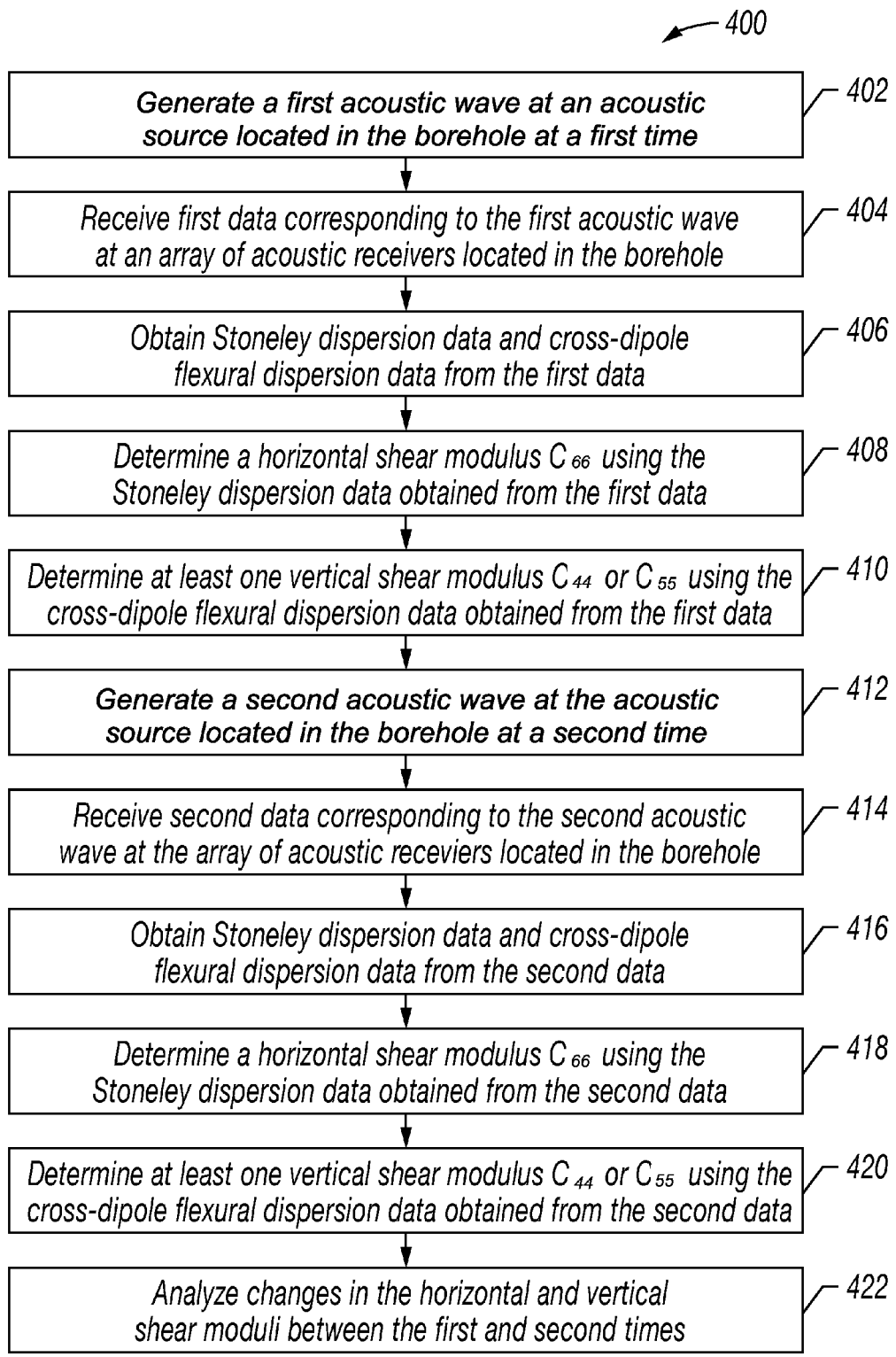
FIG. 4A is a flow diagram illustrating example operations for identifying sanding in production wells using time-lapse sonic data.

Referring now to FIG. 4A, a flow diagram illustrating example operations 400 for identifying sanding in production wells using time-lapse sonic data is shown. It should be understood that the example operations 400 can be implemented using the acoustic source 106, the array of acoustic receivers 108 and the control unit 120 shown in FIG. 1, for example. The operations include analyzing changes in formation anisotropy between a first time (e.g., a reference time) and a second time subsequent to the first time to obtain qualitative indicators of the occurrence in sanding in the production well. Optionally, the first time is a time before production at the borehole begins and the second time can be a time after production at the borehole begins. It should be understood that the first and second times should not be limited to times before and after production at the borehole begins, respectively. For example, both the first and second times can optionally be times after production at the borehole begins with the second time being subsequent in time as compared to the first time. The operations can be used to identify a layer in the formation through which a borehole extends that exhibits a substantial increase in a volume of sand. The substantial increase in the volume of sand can substantially reduce a volume of hydrocarbon production during the course of production at the borehole. The substantial increase in the volume of sand as used herein can reduce the volume of hydrocarbon production to a volume of hydrocarbon (e.g., oil or gas) production that is approximately less than 50% of the volume of hydrocarbon production at the reference time (e.g., the first time). In other words, the substantial increase in the volume of sand as used herein can reduce the volume of hydrocarbon production to a volume of hydrocarbon production between approximately 50% and 0% (e.g., approximately less than 50%) of the volume of hydrocarbon production at the reference time.

At 402, a first acoustic wave can be generated at an acoustic source located in the borehole. The first acoustic wave can be generated at a first time (e.g., the reference time). At 404, first data corresponding to the first acoustic wave can be received at an array of acoustic receivers located in the borehole. Then, at 406, Stoneley dispersion data and cross-dipole flexural dispersion data can be obtained from the first data. Thereafter, at 408 and 410, respectively, a horizontal shear modulus $C_{66}$ can be determined using the Stoneley dispersion data obtained from the first data and at least one vertical shear modulus $C_{44}$ or $C_{55}$ can be determined using the cross-dipole flexural dispersion data obtained from the first data. Optionally, a lithology map showing volumetric distribution of minerals such as quartz, clay, hydrocarbons, etc. as a function of depth can be obtained at this time.

At 412, a second acoustic wave can be generated at the acoustic source. The second acoustic wave can be generated at a second time subsequent to the first time. At 414, second data corresponding to the second acoustic wave can be received at the array of acoustic receivers. Then, at 416, Stoneley dispersion data and cross-dipole flexural dispersion data can be obtained from the second data. Thereafter, at 418 and 420, respectively, a horizontal shear modulus $C_{66}$ can be determined using the Stoneley dispersion data obtained from the second data and at least one vertical shear modulus $C_{44}$ or $C_{55}$ can be determined using the cross-dipole flexural dispersion data obtained from the second data.

It should be understood that the Stoneley dispersion and horizontal shear modulus $C_{66}$ can be obtained as follows. The high-frequency monopole waveforms, which are present in the recorded sonic data, can be processed to obtain the far-field compressional slowness, and the low-frequency monopole waveforms, which are also present in the recorded sonic data, can be processed to obtain the lowest-order Stoneley dispersion. The far-field compressional slowness can be used as an input parameter in the cost function in the inversion of the Stoneley dispersion or the flexural dispersion for shear slownesses as discussed below. The far-field compressional slowness can also be used to determine the search interval for the formation shear slowness as discussed in below. Next, the Stoneley dispersion can be inverted over a select bandwidth (e.g., 2 to 3 kHz) in a fast formation to obtain the far-field shear slowness, which can be converted into shear modulus $C_{66}$ (e.g., the horizontal shear modulus in the borehole cross-sectional plane). Additionally, it should be understood that the cross-dipole flexural dispersions and vertical shear moduli $C_{44}$ and/or $C_{55}$ can be obtained as follows. The cross-dipole sonic waveforms, which are present in the recorded sonic data, can be processed to obtain the fast- and slow-dipole dispersions. The low-frequency asymptotes of the cross-dipole flexural dispersions provide estimates of the far-field dipole shear slownesses, which can be converted into shear moduli $C_{44}$ and $C_{55}$ (e.g., the vertical shear moduli in the borehole axial planes). Alternatively or additionally, the vertical shear moduli $C_{44}$ and/or $C_{55}$ can be obtained by inversion.

After obtaining the shear moduli at the first and second times, changes in the horizontal and vertical shear moduli between the first and second times are analyzed at 422. Optionally, the relationships between the shear moduli obtained at the first time are compared with the relationships between the shear moduli obtained at the second time. The changes can provide a qualitative indication of a change in anisotropic characteristics of the layer of the formation resulting from production at the borehole, which can be caused by an increase in the volume of sand.

For example, the horizontal shear modulus $C_{66}$ can be compared to at least one vertical shear modulus $C_{44}$ or $C_{55}$ obtained from sonic data obtained at the first time. Additionally, the horizontal shear modulus $C_{66}$ can be compared to at least one vertical shear modulus $C_{44}$ or $C_{55}$ obtained from sonic data obtained at the second time. As discussed above which regard to FIG. 3A, in the absence of substantial sanding when a reservoir fluid flows through a permeable layer in the formation, the relationship between the horizontal shear modulus $C_{66}$ and at least one of the vertical shear moduli $C_{44}$, $C_{55}$ satisfies the following relationship: $C_{66} < C_{44}$ or $C_{66}$. On the other hand, as discussed above with regard to FIG. 3B, in the presence of substantial sanding when the reservoir fluid cannot flow through an impermeable layer in the formation, the relationship between the horizontal shear modulus $C_{66}$ and at least one of the vertical shear moduli $C_{44}$, $C_{55}$ satisfies the following relationship: $C_{66} > C_{44}$ or $C_{55}$.

One qualitative indicator that substantial sanding has occurred at a given depth between the first and second times is if: (a) a relationship between the horizontal shear modulus $C_{66}$ and at least one vertical shear modulus $C_{44}$ or $C_{55}$ determined from the first data (e.g., obtained at the first time) satisfies $C_{66} < C_{44}$ or $C_{55}$ and (b) a relationship between the horizontal shear modulus $C_{66}$ and at least one vertical shear modulus $C_{44}$ or $C_{55}$ determined from the second data (e.g., obtained at the second time subsequent to the first time) satisfies $C_{66} > C_{44}$ or $C_{55}$. As discussed above, a substantial increase in the volume of sand can substantially reduce the volume of hydrocarbon production as compared to the volume of hydrocarbon production at the first time (e.g., the reference time).

Figure 5:
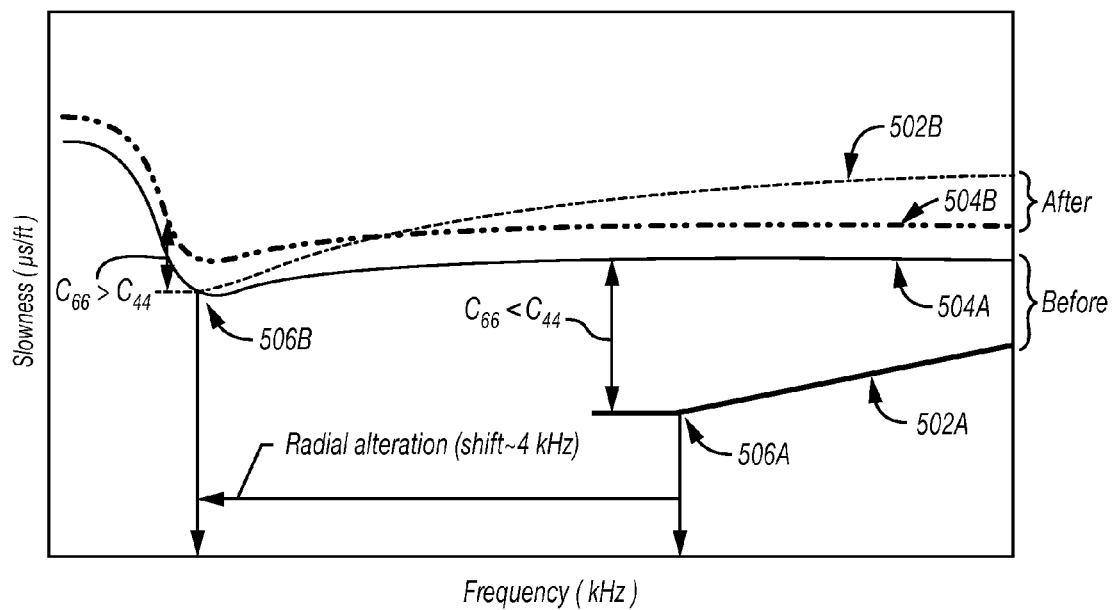
FIG. 5 is a graph illustrating a comparison between example monopole Stoneley dispersion and example dipole flexural dispersion obtained from sonic data measured at times before and after production at a borehole begins.

FIG. 5 is a graph illustrating a comparison between example monopole Stoneley dispersion and example dipole flexural dispersion obtained from sonic data collected at a time before production at a borehole begins and example monopole Stoneley dispersion and example dipole flexural dispersion obtained from sonic data collected at a time after production at the borehole begins. In FIG. 5, the example dipole flexural dispersions before and after production begins are shown as reference numerals 502A and 502B, respectively. The example monopole Stoneley dispersions before and after production begins are shown as reference numerals 504A and 504B, respectively. FIG. 5 illustrates that the relationship between the horizontal shear modulus $C_{66}$ (e.g., obtained from the monopole Stoneley dispersion) and the vertical shear modulus $C_{44}$ (e.g., obtained from the dipole flexural dispersion) determined from sonic data collected before production begins satisfies $C_{66} < C_{44}$ and the relationship between the horizontal shear modulus $C_{66}$ (e.g., obtained from the monopole Stoneley dispersion) and the vertical shear modulus $C_{44}$ (e.g., obtained from the dipole flexural dispersion) determined from sonic data collected after production begins satisfies $C_{66} > C_{44}$, which provides a qualitative indicator that sanding occurred at the given depth.

One qualitative indicator that substantial sanding has not occurred at a given depth between the first and second times is if: (a) a relationship between the horizontal shear modulus $C_{66}$ and at least one vertical shear modulus $C_{44}$ or $C_{55}$ determined from the first data (e.g., obtained at the first time) satisfies $C_{66} < C_{44}$ or $C_{55}$ and (b) a relationship between the horizontal shear modulus $C_{66}$ and at least one vertical shear modulus $C_{44}$ or $C_{55}$ determined from the second data (e.g., obtained at the second time subsequent to the first time) still satisfies $C_{66} < C_{44}$ or $C_{55}$. An insubstantial increase in the volume of sand does not substantially reduce the volume of hydrocarbon production as compared to the volume of hydrocarbon production at the first time (e.g., the reference time). The insubstantial increase in the volume of sanding as used herein does not reduce the volume of hydrocarbon production below about 50% of the volume of hydrocarbon production at the first time (e.g., the reference time). In other words, the volume of hydrocarbon production is maintained at a volume of hydrocarbon production that is between approximately 50% and 100% (e.g., greater than approximately 50%) of the volume of hydrocarbon production at the first time.

One qualitative indicator that a given depth has not contributed to the flow of hydrocarbons between the first and second times, e.g., the given depth of the formation is in the same state if: (a) a relationship between the horizontal shear modulus $C_{66}$ and the vertical shear moduli $C_{44}$ and $C_{55}$ determined from the first data (e.g., obtained at the first time) satisfies $C_{66} = C_{44} = C_{55}$ and (b) a relationship between the horizontal shear modulus $C_{66}$ and the vertical shear moduli $C_{44}$ and $C_{55}$ determined from the second data (e.g., obtained at the second time subsequent to the first time) also satisfies $C_{66} = C_{44} = C_{55}$.

Figure 4B:
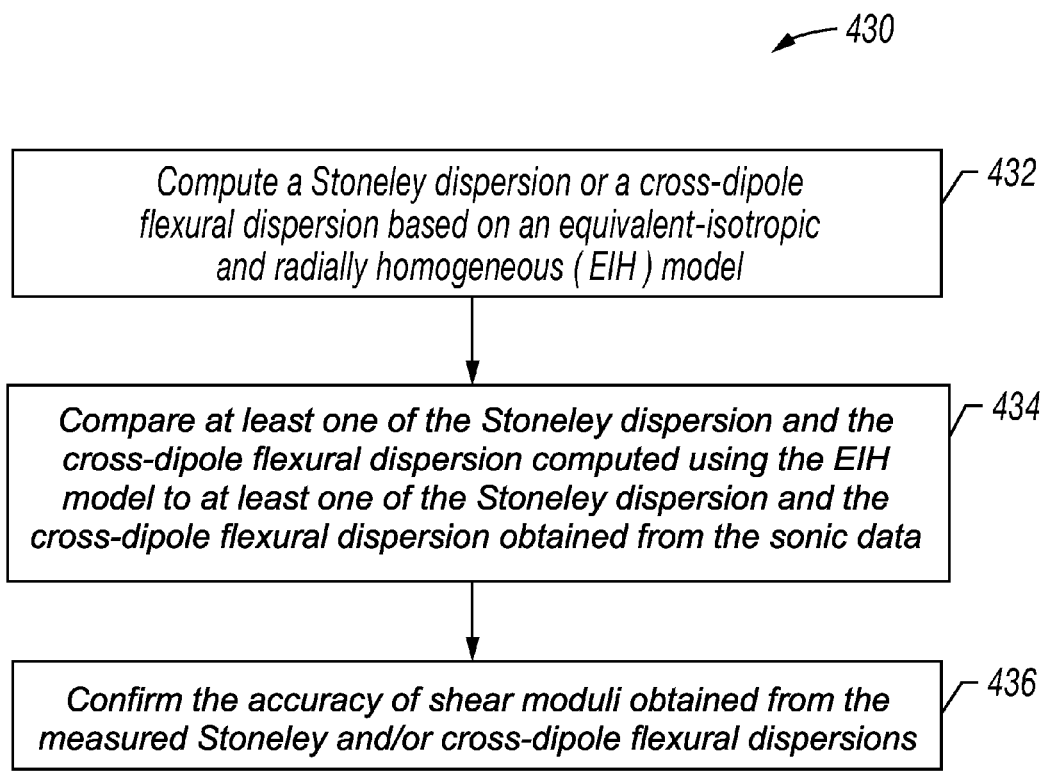
FIG. 4B is a flow diagram illustrating example operations for confirming the accuracy of the shear moduli obtained from sonic data.

Optionally, it is possible to confirm the accuracy of either the horizontal shear modulus $C_{66}$ obtained from the Stoneley dispersion and/or the vertical shear modulus $C_{44}$ or $C_{55}$ obtained from the cross-dipole flexural dispersions or by inversion. It should be understood that this confirmation can be performed after or during processing the sonic data collected at either the first time or the second time. Optionally, this confirmation can be performed after or during processing the sonic data collected at each of the first and second times. FIG. 4B is a flow diagram illustrating example operations 430 for confirming the accuracy of the shear moduli. At 432, a Stoneley dispersion or a cross-dipole flexural dispersion can be estimated based on an equivalent-isotropic and radially homogeneous (EIH) model. For example, the Stoneley dispersion can be computed using the EIH model and the far-field shear modulus (e.g., the horizontal shear modulus $C_{66}$) obtained from the sonic data. Alternatively or additionally, the cross-dipole flexural dispersion can be estimated based on an EIH model. For example, the fast- and slow-dipole dispersions can be computed using two different EIH models and the far-field shear moduli (e.g., the vertical shear moduli $C_{44}$ and $C_{55}$) obtained from the sonic data. It should be understood that the EIH models can explicitly account for the presence of the casing (e.g., a steel casing surrounding the borehole) and sonic tool effects. Then, at 434, the Stoneley dispersion computed using the EIH model can be compared to the Stoneley dispersion obtained from the sonic data (e.g., the measured Stoneley dispersion). Alternatively, the cross-dipole flexural dispersion computed using the EIH model can be compared to the cross-dipole flexural dispersion obtained from the sonic data (e.g., the measured cross-dipole flexural dispersion). At 436, if there is close agreement between the computed and measured Stoneley dispersions or between the computed and measured cross-dipole flexural dispersions, the accuracy of shear moduli obtained from the measured Stoneley and/or cross-dipole flexural dispersions can be confirmed. This disclosure contemplates that close agreement as used herein is a difference of less than approximately 4% between the computed and measured dispersions.

Figure 4C:
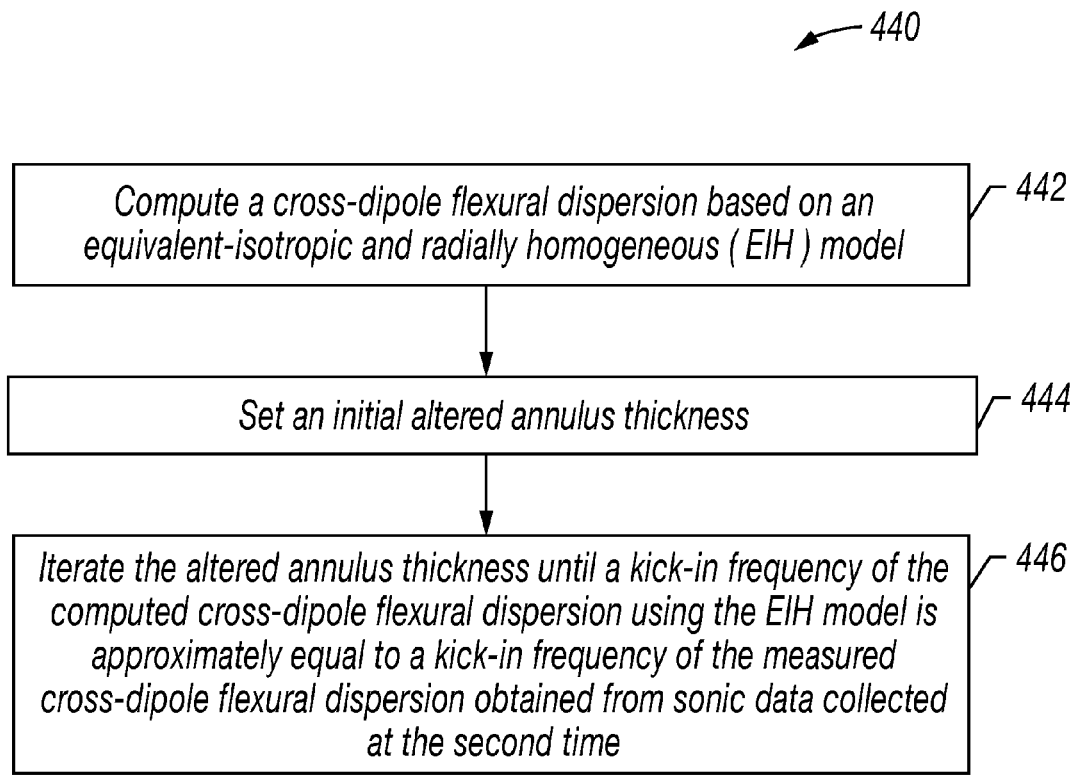
FIG. 4C is a flow diagram illustrating example operations for estimating a radial extent of an altered zone surrounding at least a portion of a casing that encloses a borehole.

Referring now to FIG. 4C, a flow diagram illustrating example operations 440 for estimating a radial extent of an altered zone surrounding at least a portion of a casing that encloses the borehole is shown. For example, a kick-in frequency of the cross-dipole flexural dispersion (e.g., the measured cross-dipole flexural dispersion) obtained from sonic data collected at the first time can be identified. Additionally, a kick-in frequency of the measured cross-dipole flexural dispersion obtained from sonic data collected at the second time can be identified. As discussed above, the kick-in frequency as used herein is a frequency where the cross-dipole flexural dispersion data exhibits a positive slope away from a non-dispersive slowness at low frequency.

At 442, a cross-dipole flexural dispersion can be computed based on an EIH model. This computation is discussed in detail above. After computing the cross-dipole flexural dispersion from the EIH model, an initial altered annulus thickness can be set at 444. Then, at 446, the altered annulus thickness is iterated until a kick-in frequency of the computed cross-dipole flexural dispersion (e.g., computed using the EIH model) is approximately equal to the kick-in frequency of the measured cross-dipole flexural dispersion obtained from sonic data collected at the second time. The altered annulus thickness obtained through the iterative process provides an estimate for the radial extent of the altered zone.

Referring now to FIG. 5, the respective kick-in frequencies 506A and 506B of the example measured cross-dipole flexural dispersions are shown. In FIG. 5, the kick-in frequency shifts, for example by approximately 4 kHz, between the measured cross-dipole flexural dispersions. In other words, in FIG. 5, the kick-in frequency of the measured cross-dipole flexural dispersion at the second time is approximately 4 kHz less than the kick-in frequency of the measured cross-dipole flexural dispersion at the first time. A shift in the kick-in frequency can provide a quantitative indicator of a significant amount of alteration outside of the casing surrounding the borehole. By calculating the amount of shift in the kick-in frequency, it is possible to estimate the radial extent of an altered zone.

Described below is an example inversion algorithm for estimating the horizontal shear modulus in the borehole cross-sectional plane (e.g., $C_{66}$) from the Stoneley dispersion.

Model Configuration

Figure 6A:
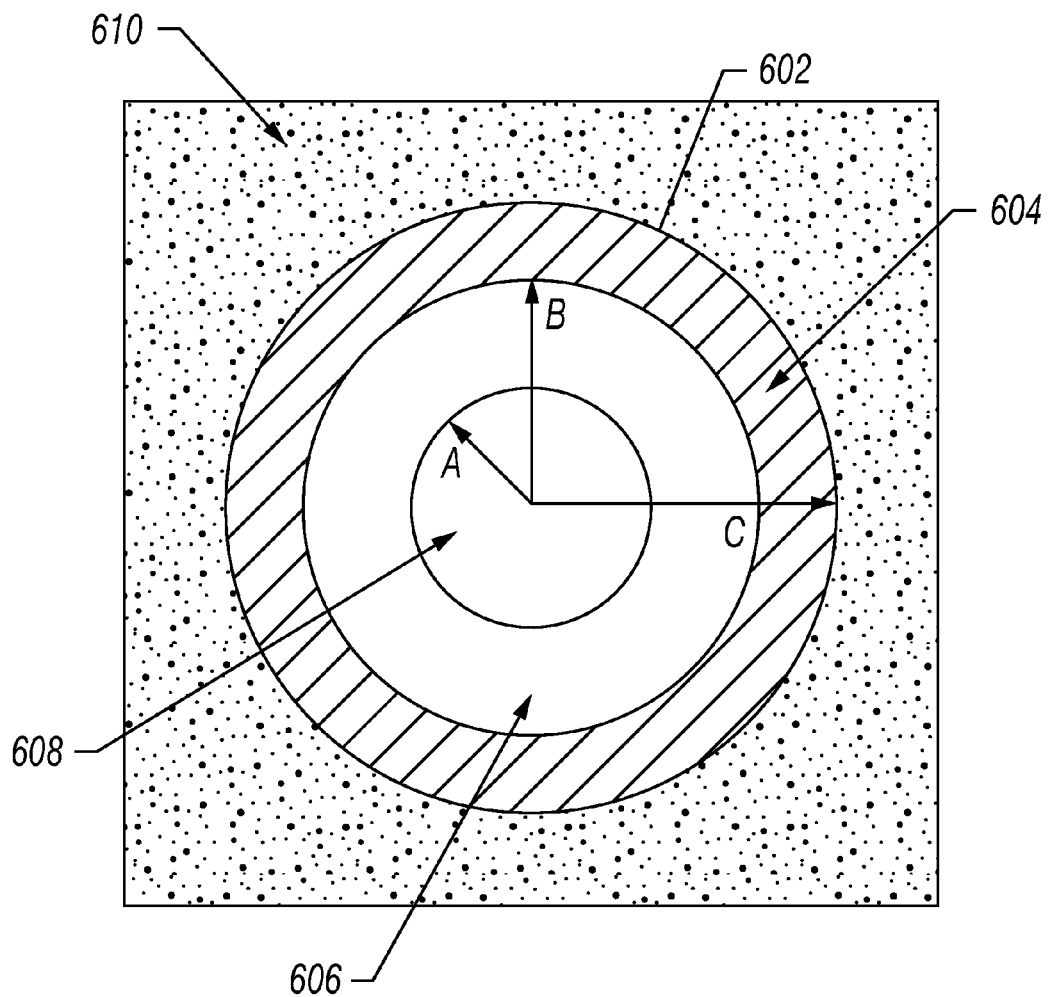
FIG. 6A is a schematic diagram illustrating a cross-sectional view of a fluid-filled, cased borehole having a sonic tool arranged therein according to some implementations discussed herein.

An example borehole sonic measurement system can include concentrically-placed, cylindrically-layered structures. Depending on different applications, the system can have different types of multiple cylindrical layers of either fluid or elastic medium. The presence of different layers determines the appropriate boundary conditions at the layer interface that must be satisfied. FIG. 6A is a schematic diagram illustrating a cross-sectional view of a fluid-filled, cased borehole having a sonic tool arranged therein according to some implementations discussed herein. Before production or when the near-wellbore alteration zone is thin, the system can be described by four cylindrical layers (e.g., formation, casing, drilling fluid and sonic tool). For example, in FIG. 6A, a borehole 602 is provided in a formation 610. The borehole 602 is surrounded by a casing 604. Additionally, the borehole 602 is filled with a drilling or borehole fluid 606, and a sonic tool 608 is arranged in the borehole 602. As shown in FIG. 6A, the casing 604, drilling fluid 606 and sonic tool 608 are concentrically-placed and cylindrically-layered in the borehole 602. Each layer is assumed to be homogeneous, isotropic and purely elastic.

Calculation of Modal Dispersions

The existence condition for borehole guided waves using a fundamental solution for the displacement and the stresses associated with the elastic wave propagation in cylindrical structures is obtained by satisfying the continuity conditions at each of the interfaces using appropriate solutions in each of the layers. Guided borehole modes in a cylindrical structure such as that illustrated by FIG. 6A can be expressed in terms of the root of the boundary condition determinant. This can be written as:

$$D(k_z, \omega, \bar{x}) = 0, \quad (1)$$

where D is the determinant of the boundary condition matrix L, $k_z$ is the wavenumber in the direction of wave propagation, $\omega$ is the angular frequency, and $\bar{x}$ is the vector that contains material parameters of the model. The parameters of the model can optionally include the formation compressional and shear slownesses, formation density, casing compressional and shear slownesses, casing density, casing inner and outer diameters, borehole-fluid slowness and its mass density. The boundary condition matrix L is obtained by satisfying continuity conditions at all cylindrical interfaces using eigensolutions for each of the cylindrical layers.

When the parameter vector $\bar{x}$ is given in the model, solutions to Eqn. (1) are smooth curves in the ($k_z$–$\omega$) plane, written as $k_z(\omega, \bar{x})$. The modal dispersions are then obtained in the slowness-frequency domain by defining the phase slowness as Re$\{k_z\}/\omega$. However, the axial wavenumber $k_z$ can become a complex number for those so-called leaky modes that radiate energy into the surrounding formation that causes the wave amplitude to attenuate in the axial direction, but increase in the radial direction. The attenuation is, therefore, defined as [20 Im$\{k_z\}$/ln(10)] dB/m. Numerically, these dispersions and attenuations can be calculated by finding complex roots of $k_z$ in Eqn. (1) along a smooth curve in the $\omega$ domain. These root-finding algorithms can be implemented using a complex Newton-Raphson method, for example. This disclosure contemplates that other suitable root-finding algorithms for complex functions such as Mueller's method, for example, can be used.

Parametric Inversion of Modal Dispersion Data

Figure 7A:
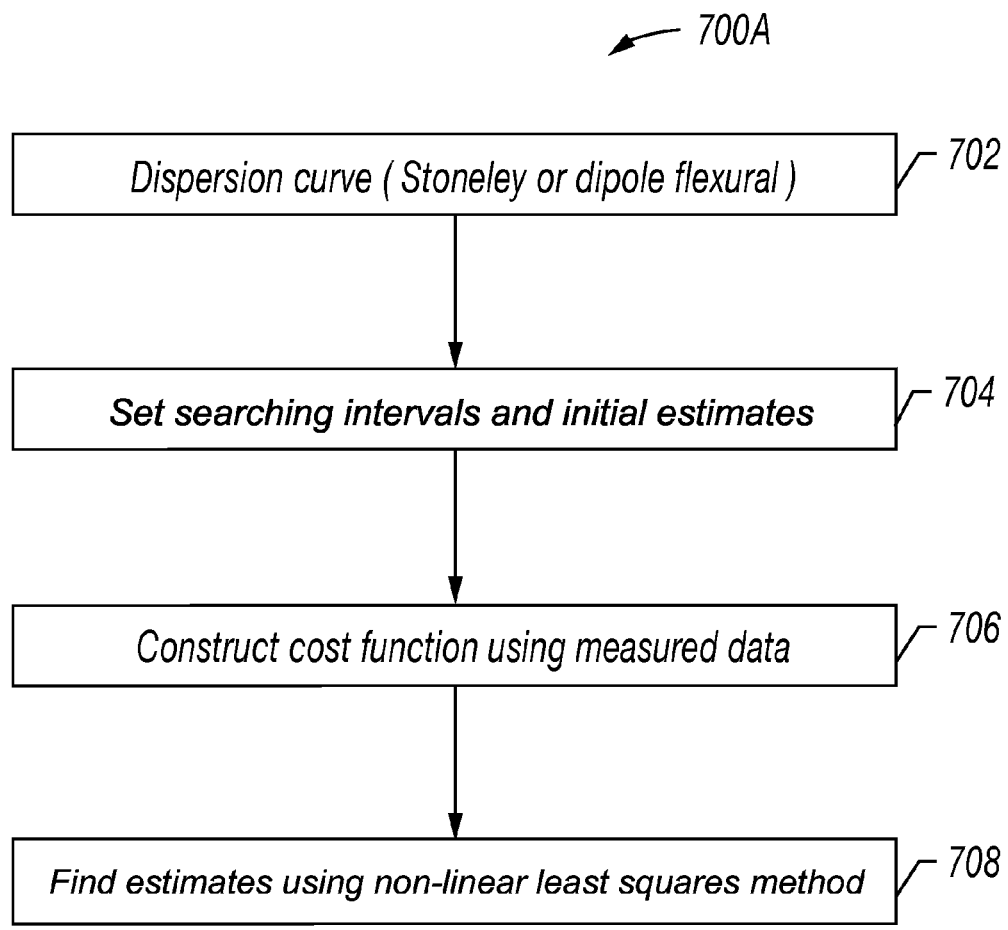
FIG. 7A is a flow diagram illustrating example operations for an inversion algorithm workflow for normal modes.

Referring now to FIG. 7A, a flow diagram illustrating example operations 700A for an inversion algorithm workflow for normal modes is shown. At 702, a dispersion curve (e.g., Stoneley or dipole flexural dispersion) is obtained from sonic data collected according to any of the systems and techniques discussed herein, for example, using a sonic tool arranged in a fluid-filled borehole. At 704, searching intervals and initial estimates for the parametric inversion can be set. To solve the inverse problem, the objective is to estimate certain unknown components of $\bar{x}$ from band-limited, possibly noisy samples of one or more modal dispersion data. For example, to invert for the formation shear slowness, the interval (e.g., a range of values for the formation shear slowness) and the initial estimate (e.g., an initial guess) for the formation shear slowness are set. When inverting for multiple parameters, the intervals and initial guesses for each of the parameters are set. The search interval for the formation shear slowness can be determined from other parameters, such as formation compressional slowness and formation density. The search interval for borehole fluid slowness can be determined from borehole fluid density. The initial estimates can be any value inside the intervals or based on other information if available. At 706, a cost function can be constructed using the measured sonic data. For example, it is possible to use a guidance mismatch as the cost function. If there are M measured pairs ($\omega_i$, $k_{zi}$) that satisfy:

$$k_{zi} = k_z(\omega_i, \bar{x}) + n_i, i = 1, 2, \ldots, M, \quad (2)$$

where $n_i$ is the noise in the data, N unknown components of $\bar{x}$ can be found that minimize the following cost function, $$\|\bar{e}(\bar{x})\|^2 = \sum_{i=1}^{M} |D(k_{zi}, \omega_i, \bar{x})|^2. \quad (3)$$

Typically N is less than the dimension of $\bar{x}$ since it is assumed that some of its components can be independently obtained from other logging measurements. It should be understood that the formation shear and borehole fluid slownesses can be estimated.

Therefore, N=1 when estimating formation shear slowness alone, and N=2 when estimating both of the formation shear and borehole fluid slownesses simultaneously. Insofar as N<M, there is sufficient data to determine the unknowns. At 708, the unknowns can be determined using any suitable method to solve a non-linear least squares problem such as a Gauss-Newton method or a Levenberg-Marquardt algorithm, for example. Numerically, the nonlinear least-squares problem can be solved by the Gauss-Newton method, where partial derivatives in Jacobian matrix are computed using a finite-difference method.

Notice that for normal modes, $k_{zi}$ is real and can be directly calculated from the modal dispersion. In the case of noise-free data, i.e., $n_i=0$ in Eqn. (2), for i=1, 2, . . . , M the cost function in Eqn. (3) can be made zero. This suggests that the cost function is well-defined for normal modes.

Figure 7B:
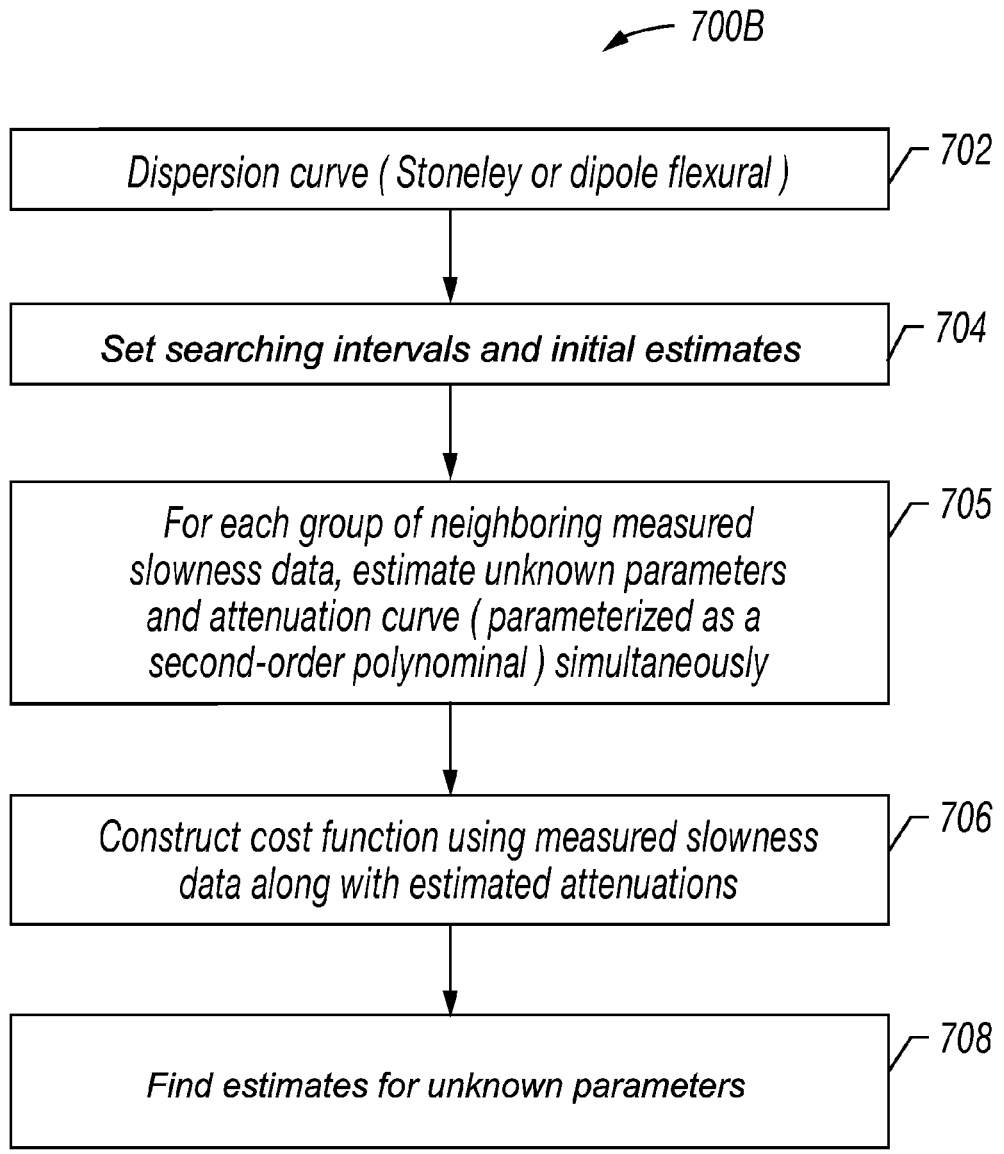
FIG. 7B is a flow diagram illustrating example operations for an inversion algorithm workflow for leaky modes.

Referring now to FIG. 7B, a flow diagram illustrating example operations 700B for an inversion algorithm workflow for leaky modes is shown. A number of the steps in this workflow are identical to those discussed above with regard to FIG. 7A and are therefore not discussed below. In the case of complex (leaky) modes, $k_{zi}$ becomes complex. The imaginary part of $k_{zi}$ is associated with the attenuation and this quantity should also be estimated to minimize the cost function. However, since the attenuation data is generally not known, an inversion algorithm can be provided that is independent of any a priori estimate of modal attenuation. Assuming that the attenuation locally is a second-order polynomial, the parameters of the polynomial for the attenuation can be treated as another set of unknown parameters that needs to be inverted together with the formation shear and borehole fluid slownesses. More specifically, for every set of five data points (frequency-slowness pair) on the dispersion curve, it is possible to invert them for five unknowns. Two of them are the formation shear and borehole fluid slownesses, whereas the other three unknowns are the parameters of the second-order polynomial for the attenuation curve at these five frequencies. This is shown in step 705 of FIG. 7B. After obtaining estimates of the attenuation curve, the cost function in Eqn. (3) is constructed using measured slowness data along with these estimated attenuations. Notice that at least five data points may be needed to run the inversion algorithm for leaky modes.

Inversion of Stoneley Dispersion Using Select Frequency Band

According to the techniques described herein, the Stoneley dispersion can be inverted using a select frequency band from 2 to 3 kHz. This is the frequency band that is relatively more sensitive to the far-field horizontal shear modulus and less affected by the near-wellbore alteration relative to higher frequencies.

Figure 6B:
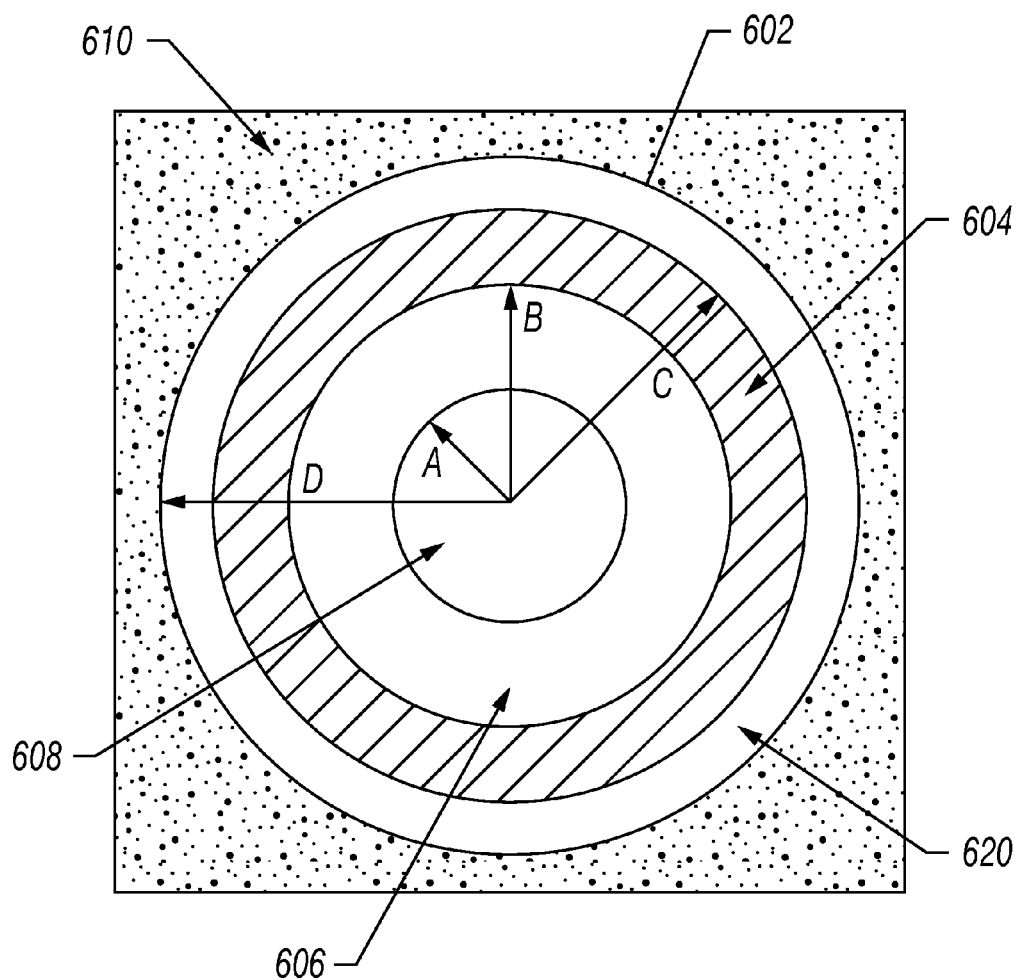
FIG. 6B is a schematic diagram illustrating a cross-sectional view of a fluid-filled, cased borehole having a sonic tool arranged therein according to other implementations discussed herein.

Estimation of Radial Extent of Alteration Zone Using Cross-Dipole Flexural Dispersions As discussed above with regard to FIG. 4C, a shift in the kick-in frequencies in the measured and computed cross-dipole flexural dispersions is an indicator of a significant amount of alteration outside the steel casing. To estimate the radial extent of the near-wellbore alteration zone, an altered annulus can be introduced outside of, or external to, a casing surrounding at least a portion of the borehole. This is shown in FIG. 6B, where a borehole 602 is provided in a formation 610. The borehole 602 is surrounded by a casing 604. Additionally, the borehole 602 is filled with a drilling or borehole fluid 606, and a sonic tool 608 is arranged in the borehole 602. An altered annulus 620 is shown around the casing 604. As shown in FIG. 6B, the altered annulus 620, casing 604, drilling fluid 606 and sonic tool 608 are concentrically-placed and cylindrically-layered in the borehole 602. It should be understood that the modal dispersion for this configuration can also be computed using the techniques discussed herein.

Since the near-wellbore alteration zone can be damaged due to the fluid invasion during production, stimulation, or drilling, its compressional and shear velocities are slower than the far-field unaltered formation. The kick-in frequency in the dipole dispersion is therefore shifted to a lower frequency. Meanwhile, the dipole dispersion at high-frequencies is more sensitive to the shear slowness of the near-wellbore altered annulus. Thus, an average shear slowness of the altered annulus (or zone) can be estimated based on the far-field shear slowness and the dipole dispersion phase slowness at high frequencies. In the examples provided herein, the shear slowness of the altered annulus is assumed to be 60 µs/ft higher than the far-field shear slowness. It should be understood that this value of the shear slowness of the altered annulus is provided only as an example and that it can have other values. Then, the altered annulus thickness can be iterated until the kick-in frequencies in the computed dipole dispersion (e.g., computed using an EIH model) matches with the measured dipole dispersion (e.g., obtained from the sonic data). The estimated altered annulus thickness is an indicator of the radial extent of alteration outside the casing.

Examples

In the examples below, two cased boreholes located in the same reservoir are considered. In other words, the two cased boreholes were drilled in the same formation. The first well (e.g., well "B") was drilled and cased and subsequently subjected to production and water stimulation for a number of years. The second well (e.g., well "A") was drilled and cased but was not subsequently used for production. Sonic data acquired from wells "A" and "B" constitutes the time-lapse data used to investigate changes in formation properties during the years of production and stimulation in well "B."

In the examples, borehole Stoneley and cross-dipole flexural dispersions at a given depth in the wells can be obtained from the field data, for example, according to any of the techniques discussed herein. For example, the borehole Stoneley and cross-dipole flexural dispersions can be obtained by processing waveforms recorded at an array of acoustic receivers using a modified matrix pencil algorithm to isolate the non-dispersive and dispersive arrivals in the wave train. Additionally, model predictions of the Stoneley and cross-dipole flexural dispersions at the given depth in the wells can also be computed, for example, according to any of the techniques discussed herein. For example, the modeled dispersions can be computed based on an EIH model.

Figure 8A:
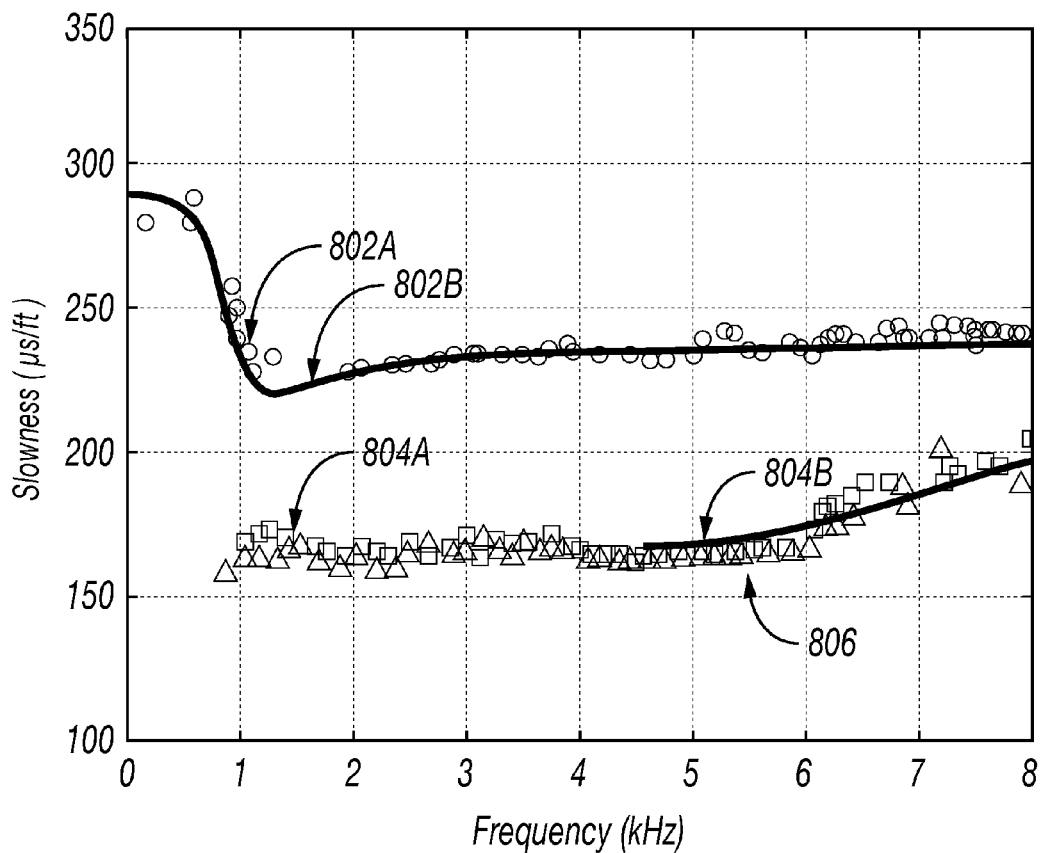
FIG. 8A is a graph illustrating an example comparison between field data and modeling data at a sanding depth before production in a borehole.

Referring now to FIG. 8A, a graph illustrating an example comparison between field data (circles, squares and triangles) and modeling data (solid lines) at a sanding depth before production in a borehole is shown. The field data and the modeling data are obtained from well "A." The borehole Stoneley dispersion 802A (circles) and the cross-dipole flexural dispersion 804A (squares and triangles) at a given depth (e.g., depth X) in well "A" (e.g., the reference well) obtained from the field data are shown. The model prediction of the Stoneley dispersion 802B (solid line) and the model prediction of the cross-dipole flexural dispersion 804B (solid line) at depth X are also shown. The overlay of the field and modeled dispersions in FIG. 8A provides a comparison of the measured and modeled Stoneley and cross-dipole flexural dispersions at depth X in the reference well (e.g., before production). The formation material parameters in the modeling computation can be obtained from measured compressional slowness (DTc) of 84 µs/ft, both the fast (DTfs) and slow (DTss) dipole shear slownesses of 165 µs/ft, and the shear slowness estimated from the Stoneley dispersion of 166 µs/ft. As shown in FIG. 8A, close agreement between the model prediction and the measured dispersions can be used to confirm the accuracy of estimated formation compressional and shear slownesses, which can be converted into the formation compressional and shear moduli. In FIG. 8A, the three shear slownesses are almost the same, which indicates that the formation surrounding the well "A" is effectively isotropic. Additionally, the measured kick-in frequency 806 for the cased-hole cross-dipole flexural dispersion is approximately at 5.5 kHz, and the modeled cross-dipole flexural dispersion is based on the model geometry shown in FIG. 6A. These observations suggest that there is no significant near-wellbore alteration outside the casing at depth X in well "A."

Figure 8B:
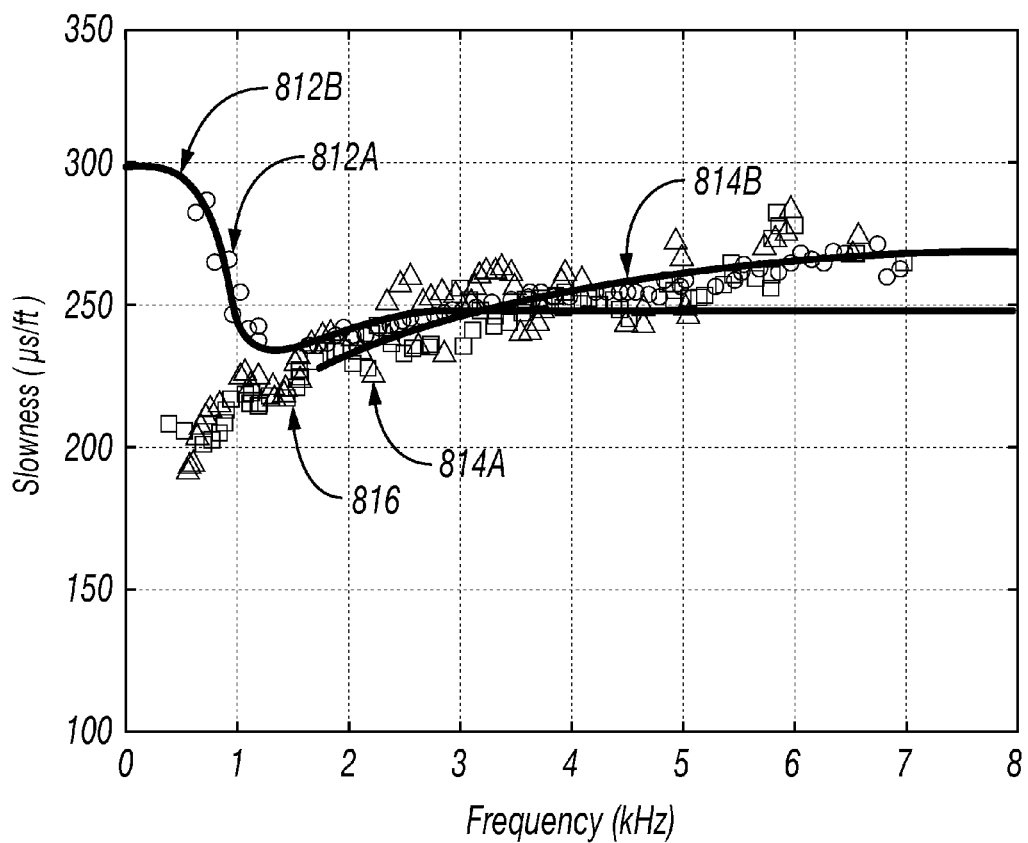
FIG. 8B is a graph illustrating an example comparison between field data and modeling data at a sanding depth after production in a borehole.

Referring now to FIG. 8B, a graph illustrating an example comparison between field data (circles, squares and triangles) and modeling data (solid lines) at a sanding depth after production in a borehole is shown. The field data and the modeling data are obtained from well "B." The borehole Stoneley dispersion 812A (circles) and the cross-dipole flexural dispersion 814A (squares and triangles) at a given depth (e.g., depth X) in well "B" (e.g., the well after many years of production) obtained from the field data are shown. The model prediction of the Stoneley dispersion 812B (solid line) and the model prediction of the cross-dipole flexural dispersion 814B (solid line) at depth X are also shown. The formation material parameters in the modeling computation can be obtained from measured compressional slowness (DTc) of 105 μs/ft, both the fast dipole shear slowness (DTfs) and the slow dipole shear slowness (DTss) of 220 μs/ft, and the shear slowness (DTsh) from the Stoneley dispersion of 182 μs/ft. The large difference between the Stoneley shear and the cross-dipole shear suggests that the formation has become highly anisotropy after years of production and associated sanding. The kick-in frequency 816 of the measured cross-dipole flexural dispersion has shifted down to about 1.5 kHz. The modeled cross-dipole flexural dispersion is based on the geometry shown in FIG. 6B, where the estimated average shear slowness in the altered zone is 280 μs/ft, and the estimated thickness of the altered zone is 0.28 m.

Figure 9A:
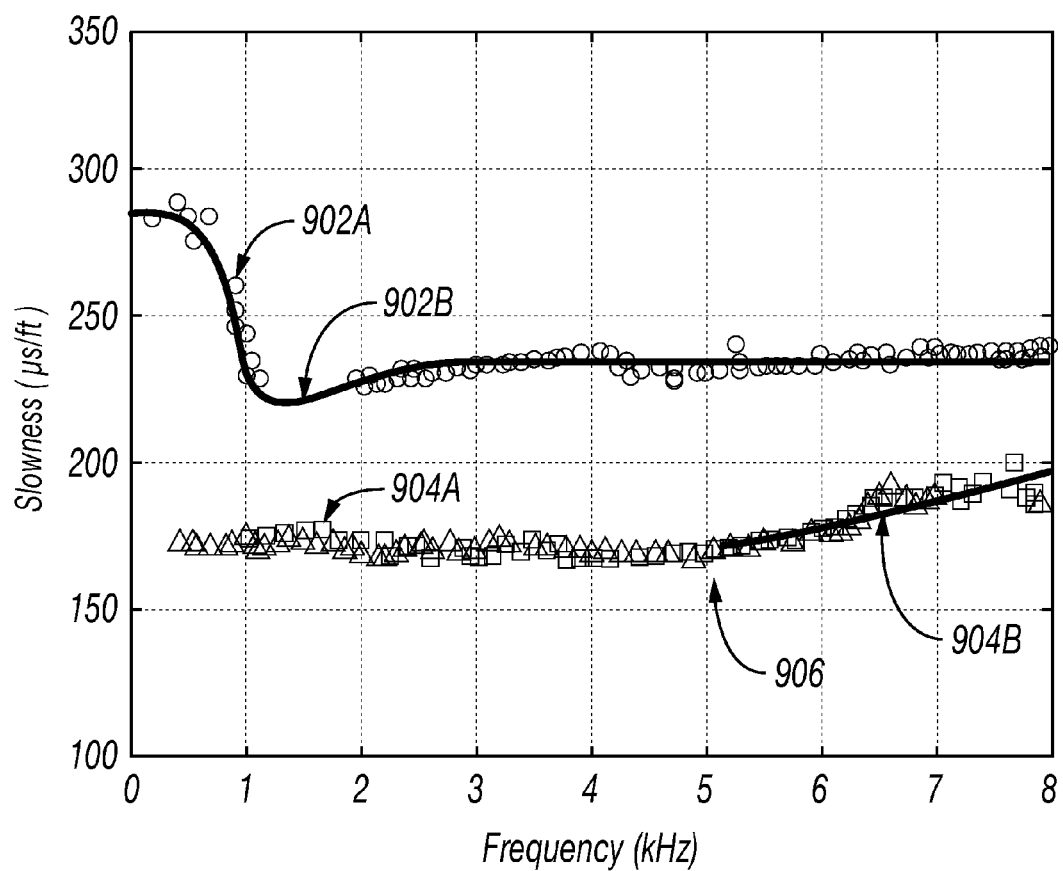
FIG. 9A is a graph illustrating an example comparison between field data and modeling data at a non-sanding depth before production in a borehole.

Referring now to FIG. 9A, a graph illustrating an example comparison between field data (circles, squares and triangles) and modeling data (solid lines) at a non-sanding depth before production in a borehole is shown. The field data and the modeling data are obtained from well "A." The borehole Stoneley dispersion 902A (circles) and the cross-dipole flexural dispersion 904A (squares and triangles) at a given depth (e.g., depth Y) in well "A" (e.g., the reference well) obtained from the field data are shown. The model prediction of the Stoneley dispersion 902B (solid line) and the model prediction of the cross-dipole flexural dispersion 904B (solid line) at depth Y are also shown. The overlay of the field and modeled dispersions in FIG. 9A provides a comparison of the measured and modeled Stoneley and cross-dipole flexural dispersions at depth Y in the reference well (e.g., before production). The formation material parameters in the modeling computation can be obtained from measured compressional slowness (DTc) of 97 μs/ft, both the fast dipole shear slowness (DTfs) and the slow dipole shear slowness (DTss) of 172 μs/ft, and the shear slowness (DTsh) estimated from the Stoneley dispersion of 169 μs/ft. As shown in FIG. 9A, close agreement between the model prediction and the measured dispersions can be used to confirm the accuracy of estimated formation compressional and shear slownesses, which can be converted into the formation compressional and shear moduli. In FIG. 9A, the three shear slownesses are almost the same, which indicates that the formation surrounding the well "A" is effectively isotropic. Additionally, the measured kick-in frequency 906 for the cased-hole cross-dipole flexural dispersion is approximately at 5 kHz, and the modeled cross-dipole flexural dispersion is based on the model geometry shown in FIG. 6A. These observations suggest that there is no significant near-wellbore alteration outside the casing at depth Y in well "A."

Figure 9B:
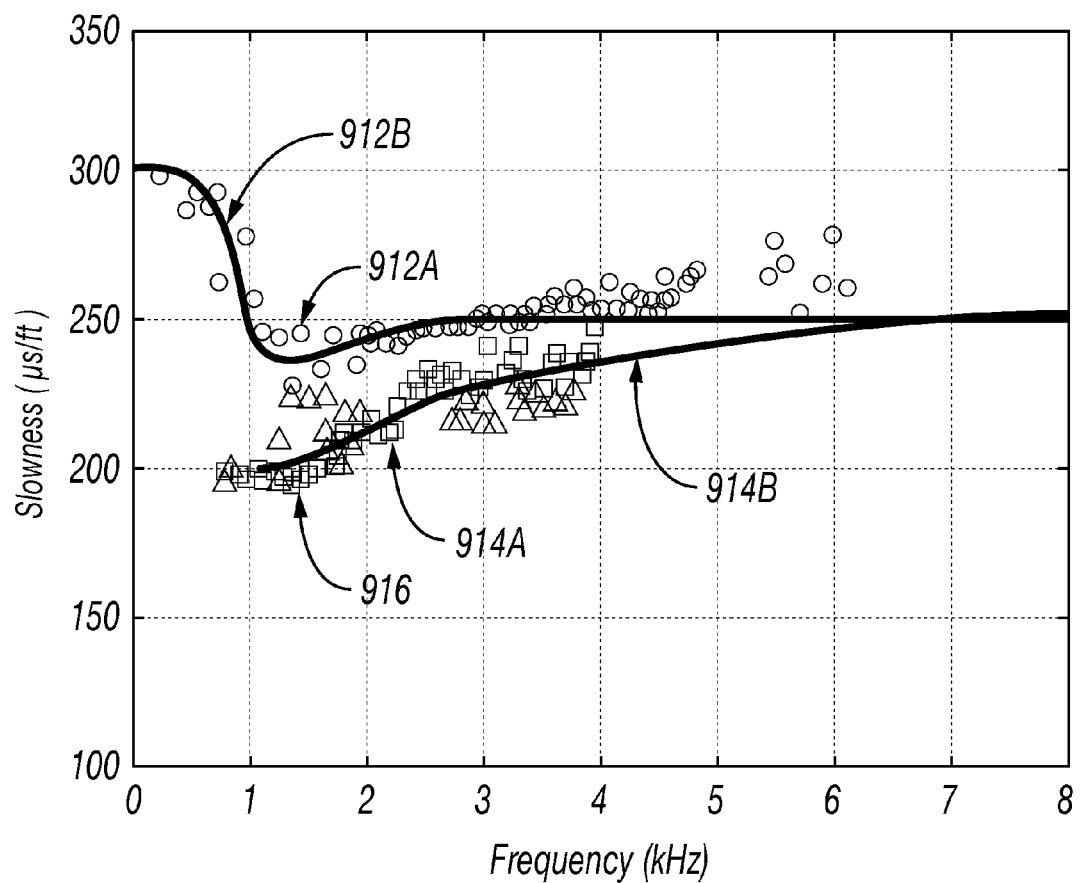
FIG. 9B is a graph illustrating an example comparison between field data and modeling data at a non-sanding depth after production in a borehole.

Referring now to FIG. 9B, a graph illustrating an example comparison between field data (circles, squares and triangles) and modeling data (solid lines) at a non-sanding depth after production in a borehole is shown. The field data and the modeling data are obtained from well "B." The borehole Stoneley dispersion 912A (circles) and the cross-dipole flexural dispersion 914A (squares and triangles) at a given depth (e.g., depth Y) in well "B" (e.g., the well after many years of production) obtained from the field data are shown. The model prediction of the Stoneley dispersion 912B (solid line) and the model prediction of the cross-dipole flexural dispersion 914B (solid line) at depth Y are also shown. The formation material parameters in the modeling computation can be obtained from measured compressional slowness (DTc) of 102 μs/ft, both the fast dipole shear slowness (DTfs) and the slow dipole shear slowness (DTss) of 200 μs/ft, and the shear slowness (DTsh) estimated from the Stoneley dispersion of 198 μs/ft. In FIG. 9B, the three shear slownesses are nearly the same, which indicates that there is no significant formation anisotropy at depth Y. This observation indicates that there is no significant sand production at depth Y in well "B" (as explained above). The measured kick-in frequency 916 has shifted down to about 1.5 kHz, and the modeled cross-dipole flexural dispersion is based on the model geometry in FIG. 6B, where the estimated average shear slowness in the altered zone is 260 μs/ft, and the estimated thickness of the altered zone is 0.28 m.

Figure 10A:
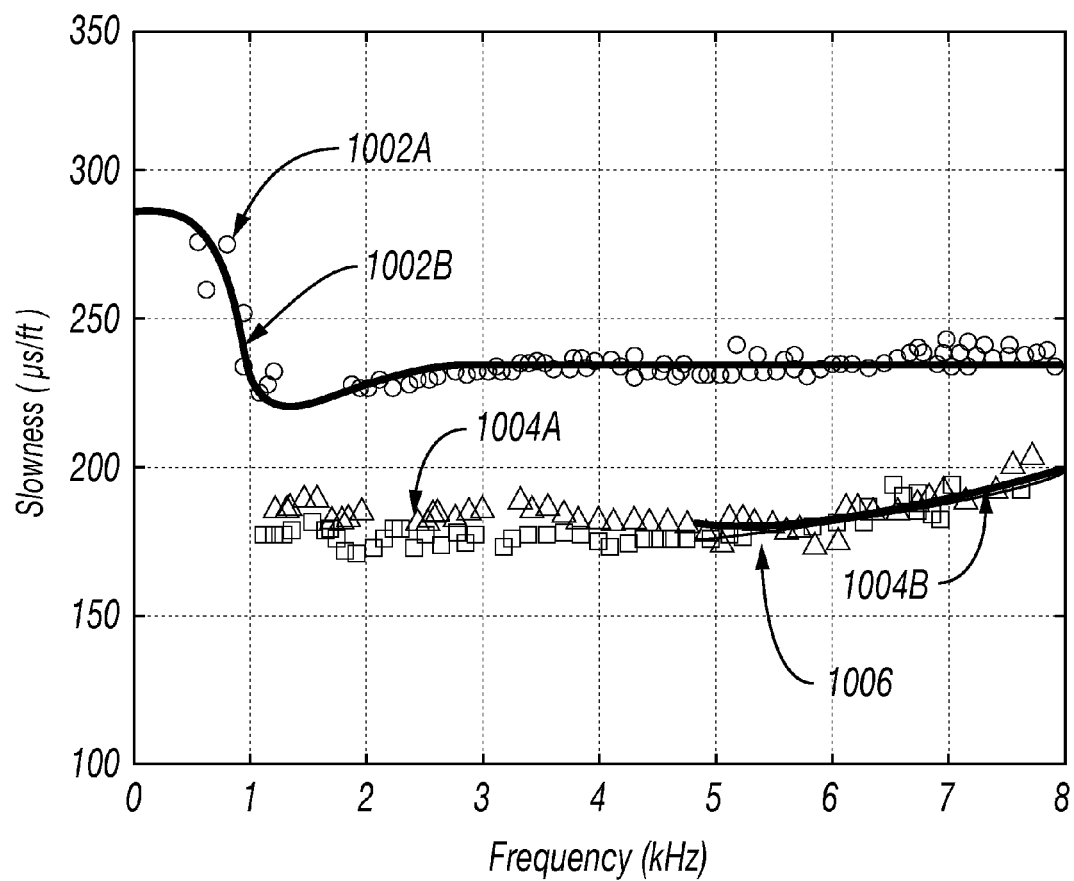
FIG. 10A is a graph illustrating an example comparison between field data and modeling data at another sanding depth before production in a borehole.

Referring now to FIG. 10A, a graph illustrating an example comparison between field data (circles, squares and triangles) and modeling data (solid lines) at a sanding depth before production in a borehole is shown. The field data and the modeling data are obtained from well "A." The borehole Stoneley dispersion 1002A (circles) and the cross-dipole flexural dispersion 1004A (squares and triangles) at a given depth (e.g., depth Z) in well "A" (e.g., the reference well) obtained from the field data are shown. The model prediction of the Stoneley dispersion 1002B (solid line) and the model prediction of the cross-dipole flexural dispersion 1004B (solid line) at depth Z are also shown. The overlay of the field and modeled dispersions in FIG. 10A provides a comparison of the measured and modeled Stoneley and cross-dipole flexural dispersions at depth Z in the reference well (e.g., before production). The formation material parameters in the modeling computation can be obtained from measured compressional slowness (DTc) of 103 μs/ft, the fast dipole shear slowness (DTfs) of 177 μs/ft, the slow dipole shear slowness (DTss) of 182 μs/ft, and the horizontal shear slowness (DTsh) of 173 μs/ft obtained from the Stoneley dispersion. As shown in FIG. 10A, close agreement between the model prediction and the measured dispersions can be used to confirm the accuracy of estimated formation compressional and shear slownesses, which can be converted into the formation compressional and shear moduli. In FIG. 10A, the three shear slownesses are almost the same, which indicates that the formation surrounding the well "A" is effectively isotropic. Additionally, the measured kick-in frequency 1006 for the cased-hole cross-dipole flexural dispersion is approximately at 5.5 kHz, and the modeled cross-dipole flexural dispersion is based on the model geometry shown in FIG. 6A. These observations suggest that there is no significant near-wellbore alteration outside the casing at depth Z in well "A."

Figure 10B:
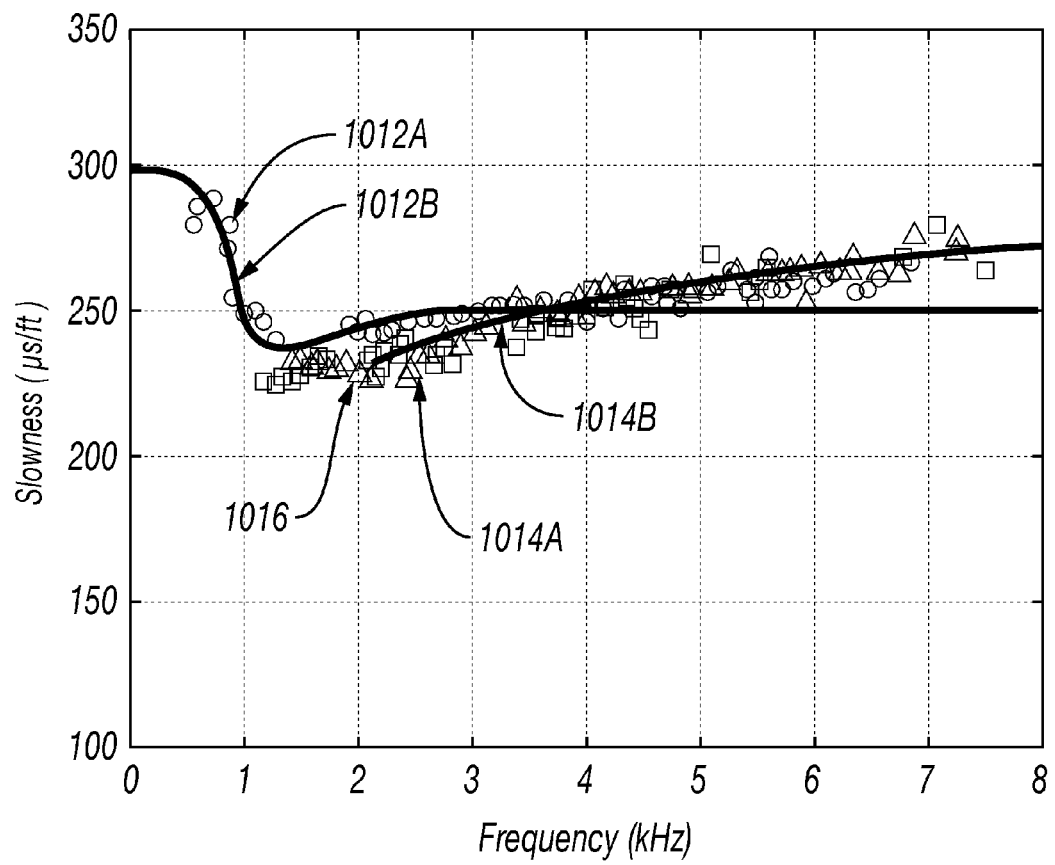
FIG. 10B is a graph illustrating an example comparison between field data and modeling data at another sanding depth after production in a borehole.

Referring now to FIG. 10B, a graph illustrating an example comparison between field data (circles, squares and triangles) and modeling data (solid lines) at a sanding depth after production in a borehole is shown. The field data and the modeling data are obtained from well "B." The borehole Stoneley dispersion 1012A (circles) and the cross-dipole flexural dispersion 1014A (squares and triangles) at a given depth (e.g., depth Z) in well "B" (e.g., the well after many years of production) obtained from the field data are shown. The model prediction of the Stoneley dispersion 1012B (solid line) and the model prediction of the cross-dipole flexural dispersion 1014B (solid line) at depth Z are also shown. The formation material parameters in the modeling computation can be obtained from measured compressional slowness (DTc) of 100 μs/ft, both the fast dipole shear slowness (DTfs) and the slow dipole shear slowness (DTss) of 230 μs/ft, and the horizontal shear slowness (DTsh) of 196 μs/ft obtained from the inversion of the Stoneley dispersion. The large difference between the Stoneley shear and the cross-dipole shear suggests that the formation has become highly anisotropy after years of production and associated sanding. Differences in the borehole dispersions before and after production can be expressed in terms of differences in the three far-field shear moduli (e.g., the vertical shear moduli $C_{44}$ and $C_{55}$ and the horizontal shear modulus $C_{66}$ from the Stoneley dispersion) caused by many years of production and stimulation. The kick-in frequency 1016 of the measured cross-dipole flexural dispersion has shifted down to about 2 kHz. The model cross-dipole flexural dispersion is based on the geometry shown in FIG. 6B, where the estimated average shear slowness in the altered zone is 290 μs/ft, and the estimated thickness of the altered zone is 0.18 m.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for identifying a layer of a formation through which a borehole extends that exhibits a significant increase in a volume of sand that reduces a volume of hydrocarbon production during the course of production at the borehole, comprising:
    generating a first acoustic wave at an acoustic source located in the borehole, the first acoustic wave being generated at a first time;
    receiving first data corresponding to the first acoustic wave at an array of acoustic receivers located in the borehole;
    obtaining Stoneley dispersion data and cross-dipole flexural dispersion data from the first data;
    determining a horizontal shear modulus, $C_{66}$, using the Stoneley dispersion data obtained from the first data;
    determining at least one vertical shear modulus, $C_{44}$ or $C_{55}$, using the cross-dipole flexural dispersion data obtained from the first data;
    generating a second acoustic wave at the acoustic source, the second acoustic wave being generated at a second time subsequent to the first time;
    receiving second data corresponding to the second acoustic wave at the array of acoustic receivers;
    obtaining Stoneley dispersion data and cross-dipole flexural dispersion data from the second data;
    determining a horizontal shear modulus, $C_{66}$, using the Stoneley dispersion data obtained from the second data;
    determining at least one vertical shear modulus, $C_{44}$ or $C_{55}$, using the cross-dipole flexural dispersion data obtained from the second data; and
    analyzing changes in the horizontal and vertical shear moduli determined from the first and second data, wherein the changes provide an indication of a change in anisotropic characteristics of the layer of the formation resulting from production at the borehole.

2. The method of claim 1, wherein the first and second times are before and after production begins at the borehole, respectively.

3. The method of claim 1, wherein analyzing changes in the horizontal and vertical shear moduli comprises comparing the horizontal shear modulus, $C_{66}$, to the at least one vertical shear modulus, $C_{44}$ or $C_{55}$.

4. The method of claim 3, further comprising determining that the layer of the formation exhibited a substantial increase in the volume of sand between the first and second times, the substantial increase in the volume of sand substantially reducing the volume of hydrocarbon production, if:
    a relationship between the horizontal shear modulus, $C_{66}$, and the at least one vertical shear modulus, $C_{44}$ or $C_{55}$, determined from the first data satisfies $C_{66}<C_{44}$ or $C_{55}$; and
    a relationship between the horizontal shear modulus, $C_{66}$, and the at least one vertical shear modulus, $C_{44}$ or $C_{55}$, determined from the second data satisfies $C_{66}>C_{44}$ or $C_{55}$.

5. The method of claim 3, further comprising determining that the layer of the formation exhibited an insubstantial increase in the volume of sand between the first and second times, the insubstantial increase in the volume of sand not substantially reducing the volume of hydrocarbon production, if relationships between the horizontal shear modulus, $C_{66}$, and the at least one vertical shear modulus, $C_{44}$ or $C_{55}$, determined from the first and second data satisfy $C_{66}<C_{44}$ or $C_{55}$.

6. The method of claim 1, wherein determining a horizontal shear modulus, $C_{66}$, using the Stoneley dispersion data comprises applying an inversion algorithm to the Stoneley dispersion data.

7. The method of claim 1, wherein the at least one vertical shear modulus, $C_{44}$ or $C_{55}$, is determined using at least one of a low frequency portion of the cross-dipole flexural dispersion data and an inversion algorithm.

8. The method of claim 1, further comprising:
    estimating a Stoneley dispersion or a cross-dipole flexural dispersion based on an equivalent-isotropic and radially homogeneous (EIH) model;
    comparing at least one of the estimated Stoneley dispersion and the estimated cross-dipole flexural dispersion and at least one of the Stoneley dispersion data and the cross-dipole flexural dispersion data obtained from the first or second data; and
    confirming an accuracy of at least one of the horizontal or vertical shear moduli $C_{66}$, $C_{44}$ or $C_{55}$ determined using the Stoneley dispersion data or the cross-dipole flexural dispersion data obtained from the first or second data based on the comparison.

9. The method of claim 1, further comprising estimating a radial extent of an altered zone surrounding at least a portion of a casing that encloses the borehole by:

identifying a kick-in frequency of each of the cross-dipole flexural dispersion data obtained from the first and second data, the kick-in frequency being a frequency where the cross-dipole flexural dispersion data exhibits a positive slope away from a non-dispersive slowness at low frequency; and calculating a shift in the kick-in frequency between the cross-dipole flexural dispersion data obtained from the first and second data, respectively, wherein the shift in the kick-in frequency is related to the radial extent of the altered zone.

10. The method of claim 9, further comprising:

computing a cross-dipole flexural dispersion based on an equivalent-isotropic and radially homogeneous (EIH) model;

setting an initial altered annulus thickness; and iterating the altered annulus thickness until a kick-in frequency of the computed cross-dipole flexural dispersion based on the EIH model is approximately equal to the kick-in frequency of the cross-dipole flexural dispersion data obtained from the second data, wherein the iterated altered annulus thickness approximates the radial extent of the altered zone.

11. A system for identifying a layer of a formation through which a borehole extends that exhibits a significant increase in a volume of sand that reduces a volume of hydrocarbon production during the course of production at the borehole, comprising:

an acoustic tool including an acoustic source configured to generate an acoustic wave and an array of acoustic receivers configured to receive data corresponding to the acoustic wave, the acoustic tool being located in the borehole; and a control unit comprising at least one processor and a memory, wherein the control unit is configured to:

cause the acoustic source to generate a first acoustic wave at a first time;

receive first data from the array of acoustic receivers, the first data corresponding to the first acoustic wave;

obtain Stoneley dispersion data and cross-dipole flexural dispersion data from the first data;

determine a horizontal shear modulus, $C_{66}$, using the Stoneley dispersion data obtained from the first data;

determine at least one vertical shear modulus, $C_{44}$ or $C_{55}$, using the cross-dipole flexural dispersion data obtained from the first data;

cause the acoustic source to generate a second acoustic wave at a second time, the second time being subsequent to the first time;

receive second data from the array of acoustic receivers, the second data corresponding to the second acoustic wave;

obtain Stoneley dispersion data and cross-dipole flexural dispersion data from the second data;

determine a horizontal shear modulus, $C_{66}$, using the Stoneley dispersion data obtained from the second data;

determine at least one vertical shear modulus, $C_{44}$ or $C_{55}$, using the cross-dipole flexural dispersion data obtained from the second data; and analyze changes in the horizontal and vertical shear moduli determined from the first and second data, wherein the changes provide an indication of a change in anisotropic characteristics of the layer of the formation resulting from production at the borehole.

12. The system of claim 11, wherein the first and second times are before and after production begins at the borehole, respectively.

13. The system of claim 11, wherein analyzing changes in the horizontal and vertical shear moduli comprises comparing the horizontal shear modulus, $C_{66}$, to the at least one vertical shear modulus, $C_{44}$ or $C_{55}$.

14. The system of claim 13, wherein the control unit is further configured to determine that the layer of the formation exhibited a substantial increase in the volume of sand between the first and second times, the substantial increase in the volume of sand substantially reducing the volume of hydrocarbon production, if:

a relationship between the horizontal shear modulus, $C_{66}$, and the at least one vertical shear modulus, $C_{44}$ or $C_{55}$, determined from the first data satisfies $C_{66}<C_{44}$ or $C_{55}$; and a relationship between the horizontal shear modulus, $C_{66}$, and the at least one vertical shear modulus, $C_{44}$ or $C_{55}$, determined from the second data satisfies $C_{66}>C_{44}$ or $C_{55}$.

15. The system of claim 13, wherein the control unit is further configured to determine that the layer of the formation exhibited an insubstantial increase in the volume of sand between the first and second times, the insubstantial increase in the volume of sand not substantially reducing the volume of hydrocarbon production, if relationships between the horizontal shear modulus, $C_{66}$, and the at least one vertical shear modulus, $C_{44}$ or $C_{55}$, determined from the first and second data satisfy $C_{66}<C_{44}$ or $C_{55}$.

16. The system of claim 11, wherein the control unit is further configured to apply an inversion algorithm to the Stoneley dispersion data to determine the horizontal shear modulus, $C_{66}$.

17. The system of claim 11, wherein the control unit is further configured to use at least one of a low frequency portion of the cross-dipole flexural dispersion data and an inversion algorithm to determine the at least one vertical shear modulus, $C_{44}$ or $C_{55}$.

18. The system of claim 11, wherein the control unit is further configured to:

estimate a Stoneley dispersion or a cross-dipole flexural dispersion based on an equivalent-isotropic and radially homogeneous (EIH) model;

compare at least one of the estimated Stoneley dispersion and the estimated cross-dipole flexural dispersion and at least one of the Stoneley dispersion data and the cross-dipole flexural dispersion data obtained from the first or second data; and confirm an accuracy of at least one of the horizontal or vertical shear moduli $C_{66}$, $C_{44}$ or $C_{55}$ determined using the Stoneley dispersion data or the cross-dipole flexural dispersion data obtained from the first or second data based on the comparison.

19. The system of claim 11, wherein the control unit is further configured to estimate a radial extent of an altered zone surrounding at least a portion of a casing that encloses the borehole by:

identifying a kick-in frequency of each of the cross-dipole flexural dispersion data obtained from the first and second data, the kick-in frequency being a frequency where the cross-dipole flexural dispersion data exhibits a positive slope away from a non-dispersive slowness at low frequency; and calculating a shift in the kick-in frequency between the cross-dipole flexural dispersion data obtained from the first and second data, respectively, wherein the shift in the kick-in frequency is related to the radial extent of the altered zone.

20. The system of claim 19, wherein the control unit is further configured to:

compute a cross-dipole flexural dispersion based on an equivalent-isotropic and radially homogeneous (EIH) model;

set an initial altered annulus thickness; and iterate the altered annulus thickness until a kick-in frequency of the computed cross-dipole flexural dispersion based on the EIH model is approximately equal to the kick-in frequency of the cross-dipole flexural dispersion data obtained from the second data, wherein the iterated altered annulus thickness approximates the radial extent of the altered zone.

* * * * *